US011844118B2

(12) United States Patent
Lee et al.

(10) Patent No.: US 11,844,118 B2
(45) Date of Patent: *Dec. 12, 2023

(54) METHOD FOR TRANSMITTING AND RECEIVING SIGNALS FOR PERFORMING RANDOM ACCESS PROCESS IN UNLICENSED BAND, AND APPARATUS THEREFOR

(71) Applicant: LG Electronics Inc., Seoul (KR)

(72) Inventors: Jeongsu Lee, Seoul (KR); Sukhyon Yoon, Seoul (KR); Hyunsoo Ko, Seoul (KR); Suckchel Yang, Seoul (KR); Seonwook Kim, Seoul (KR); Youngdae Lee, Seoul (KR); Seokmin Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,850

(22) Filed: Feb. 9, 2023

(65) Prior Publication Data

US 2023/0199860 A1 Jun. 22, 2023

Related U.S. Application Data

(63) Continuation of application No. 17/704,868, filed on Mar. 25, 2022, now Pat. No. 11,638,310, which is a
(Continued)

(30) Foreign Application Priority Data

Sep. 25, 2019 (KR) .................. 10-2019-0118400
Sep. 27, 2019 (KR) .................. 10-2019-0120136

(51) Int. Cl.
*H04W 74/08* (2009.01)
*H04W 52/36* (2009.01)
*H04W 72/044* (2023.01)

(52) U.S. Cl.
CPC ....... *H04W 74/0841* (2013.01); *H04W 52/36* (2013.01); *H04W 72/046* (2013.01); *H04W 74/0816* (2013.01); *H04W 74/0866* (2013.01)

(58) Field of Classification Search
CPC ............ H04W 74/0841; H04W 52/36; H04W 72/046; H04W 74/0816; H04W 74/0866
See application file for complete search history.

(56) References Cited

U.S. PATENT DOCUMENTS

2020/0314709 A1* 10/2020 Ly ..................... H04W 72/23
2020/0314917 A1* 10/2020 Jeon ..................... H04W 74/08
(Continued)

FOREIGN PATENT DOCUMENTS

KR 2019-0012092 2/2019

OTHER PUBLICATIONS

3GPP, "3rd Generation Partnership Project; Technical Specification Group Radio Access Network; NR; Physical layer procedures for control (Release 15)," TS 38.213 V15.5.0, Mar. 2019, 105 pages.
Huawei & Hisicion, "Timers and counters for two-steps Rach," R2-1816604, Presented at 3GPP TSG-RAN WG2 Meeting #104, Spokane, US, Nov. 12-16, 2018, 2 pages.
(Continued)

Primary Examiner — Kashif Siddiqui
(74) Attorney, Agent, or Firm — Fish & Richardson P.C.

(57) ABSTRACT

Disclosed is a method for transmitting and receiving signals to enable a terminal to perform a random access channel procedure (RACH procedure) in an unlicensed band. In particular, the method comprises: transmitting an uplink signal including a first physical random access channel (PRACH) and a first physical uplink shared channel (PUSCH) to a base station; and receiving, from the base station, a downlink signal related to contention resolution in response to the uplink signal, wherein a power ramping counter is used to set the transmission power of the uplink signal, and the value of the power ramping counter may be increased on the basis of a transmission spatial beam for the
(Continued)

transmission of the uplink signal being configured in the same manner as a transmission spatial beam for the transmission of a PRACH prior to the uplink signal.

13 Claims, 25 Drawing Sheets

Related U.S. Application Data continuation of application No. PCT/KR2020/013074, filed on Sep. 25, 2020.

(56) References Cited

U.S. PATENT DOCUMENTS

| | | | |
|---|---|---|---|
| 2021/0100004 A1* | 4/2021 | Yang | H04W 72/21 |
| 2022/0217789 A1* | 7/2022 | Lee | H04W 74/0816 |

OTHER PUBLICATIONS

Intel Corporation, "Enhancements to initial access and mobility for NR-unlicensed," R1-1808686, Presented at 3GPP TSG RAN WG1 Meeting #94, Gothenburg, Sweden, Aug. 20-24, 2018, 4 pages.

International Search Report and Written Opinion in International Appln. No. PCT/KR2020/013074, dated Jan. 15, 2021, 9 pages (with English translation).

Nokia & Nokia Shanghai Bell, "Feature lead summary#1 on 2 step RACH procedures," R1-1909668, Presented at 3GPP TSG RAN WG1 #97, Prague, Czech Republic, Aug. 26-30, 2019, 56 pages.

Nokia & Nokia Shanghai Bell, "On 2-step RACH Procedure," R1-1904716, Presented at 3GPP TSG RAN WG1 #96bis, Xi'an, China, Apr. 8-12, 2019, 16 pages.

Office Action in Korean Appln. No. 10-2022-7013779, dated Nov. 16, 2022, 11 pages (with English translation).

ZTE & Sanechips, "Further discussions on 2-step RACH procedures," R1-1905990, Presented at 3GPP TSG RAN WG1 Meeting #97, Reno, USA, May 13-17, 2019, 13 pages.

* cited by examiner

CONTROL-PLANE PROTOCOL STACK

USER-PLANE PROTOCOL STACK

Carrier aggregation between L-band and U-band

Standalone U-band(s)

METHOD FOR TRANSMITTING AND RECEIVING SIGNALS FOR PERFORMING RANDOM ACCESS PROCESS IN UNLICENSED BAND, AND APPARATUS THEREFOR

CROSS-REFERENCE TO RELATED APPLICATIONS

This application is a continuation of U.S. application Ser. No. 17/704,868, filed on Mar. 25, 2022, which is a continuation of International Application No. PCT/KR2020/013074, filed on Sep. 25, 2020, which claims the benefit of Korean Application No. 10-2019-0120136, filed on Sep. 27, 2019, and Korean Application No. 10-2019-0118400, filed on Sep. 25, 2019. The disclosures of the prior application are incorporated by reference in their entirety.

TECHNICAL FIELD

The present disclosure relates to a method of transmitting and receiving signals for performing a random access procedure by a user equipment on an unlicensed band and apparatus therefor, and more particularly, to a method of performing a 2-step random access procedure by a user equipment on an unlicensed band and apparatus therefor.

BACKGROUND

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

SUMMARY

The present disclosure provides a method for performing a random access channel (RACH) procedure by a user equipment (UE) and a device for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

In one technical aspect of the present disclosure, provided is a method of transmitting and receiving a signal for performing a Random Access Channel (RACH) procedure on an unlicensed band by a user equipment, the method including receiving a Synchronization Signal/Physical Broadcast Channel (SS/PBCH) block from a base station, obtaining a system information from a PBCH included in the SS/PBCH block, transmitting an uplink signal including a first Physical Random Access Channel (PRACH) and a first Physical Uplink Shared Channel (PUSCH) to the base station based on the system information, and receiving a downlink signal related to contention resolution from the base station in response to the uplink signal, wherein a transmission power of the uplink signal may be configured based on a power ramping counter and wherein a value of the power ramping counter may increase based on that a transmission spatial beam for the transmission of the uplink signal is configured identical to a transmission spatial beam related to transmission of a PRACH before the uplink signal.

The value of the power ramping counter may increase based on not failing in Listen Before Talk (LBT) for the uplink signal.

The transmission of the uplink signal may correspond to retransmission for the uplink signal.

Listen Before Talk (LBT) related to the PRACH may be failed.

The value of the power ramping counter may not increase based on that the transmission spatial beam for the transmission of the uplink signal is configured different from the transmission spatial beam related to the transmission of the PRACH before the uplink signal.

The power ramping counter may be used to configure the transmission power based on that the first PRACH and the first PUSCH are transmitted together through the uplink signal.

In another technical aspect of the present disclosure, provided is a user equipment transmitting and receiving a signal for performing a Random Access Channel (RACH) procedure on an unlicensed band, the user equipment including at least one transceiver, at least one processor, and at least one memory operably connected to the at least one processor and storing instructions to enable the at least one processor to perform a specific operation when executed, the specific operation including receiving a Synchronization Signal/Physical Broadcast Channel (SS/PBCH) block from a base station, obtaining a system information from a PBCH included in the SS/PBCH block, transmitting an uplink signal including a first Physical Random Access Channel (PRACH) and a first Physical Uplink Shared Channel (PUSCH) to the base station based on the system information, and receiving a downlink signal related to contention resolution from the base station in response to the uplink signal, wherein a transmission power of the uplink signal may be configured based on a power ramping counter and wherein a value of the power ramping counter may increase based on that a transmission spatial beam for the transmission of the uplink signal is configured identical to a transmission spatial beam related to transmission of a PRACH before the uplink signal.

The value of the power ramping counter may increase based on not failing in Listen Before Talk (LBT) for the uplink signal.

The transmission of the uplink signal may correspond to retransmission for the uplink signal.

Listen Before Talk (LBT) related to the PRACH may be failed.

The value of the power ramping counter may not increase based on that the transmission spatial beam for the transmission of the uplink signal is configured different from the transmission spatial beam related to the transmission of the PRACH before the uplink signal.

The power ramping counter may be used to configure the transmission power based on that the first PRACH and the first PUSCH are transmitted together through the uplink signal.

In another technical aspect of the present disclosure, provided is an apparatus for transmitting and receiving a signal for performing a Random Access Channel (RACH) procedure on an unlicensed band, the apparatus including at least one transceiver, at least one processor, and at least one memory operably connected to the at least one processor and storing instructions to enable the at least one processor to perform a specific operation when executed, the specific operation including receiving a Synchronization Signal/Physical Broadcast Channel (SS/PBCH) block from a base station, obtaining a system information from a PBCH included in the SS/PBCH block, transmitting an uplink signal including a first Physical Random Access Channel (PRACH) and a first Physical Uplink Shared Channel (PUSCH) to the base station based on the system information, and receiving a downlink signal related to contention resolution from the base station in response to the uplink signal, wherein a transmission power of the uplink signal may be configured based on a power ramping counter and wherein a value of the power ramping counter may increase based on that a transmission spatial beam for the transmission of the uplink signal is configured identical to a transmission spatial beam related to transmission of a PRACH before the uplink signal.

In further technical aspect of the present disclosure, provided is a method of transmitting and receiving a signal for performing a Random Access Channel (RACH) procedure on an unlicensed band by a base station, the method including transmitting a Synchronization Signal/Physical Broadcast Channel (SS/PBCH) block to a user equipment, receiving an uplink signal including a first Physical Random Access Channel (PRACH) and a first Physical Uplink Shared Channel (PUSCH) from the user equipment, and transmitting a downlink signal related to contention resolution to the user equipment in response to the uplink signal, wherein a transmission power of the uplink signal may be configured based on a power ramping counter and wherein a value of the power ramping counter may increase based on that a transmission spatial beam for the transmission of the uplink signal is configured identical to a transmission spatial beam related to transmission of a PRACH before the uplink signal.

In another further technical aspect of the present disclosure, provided is a computer-readable storage medium storing at least one computer program including instructions to enable at least one processor to perform operations for a user equipment when executed by the at least one processor, the operations including receiving a Synchronization Signal/Physical Broadcast Channel (SS/PBCH) block from a base station, obtaining a system information from a PBCH included in the SS/PBCH block, transmitting an uplink signal including a first Physical Random Access Channel (PRACH) and a first Physical Uplink Shared Channel (PUSCH) to the base station based on the system information, and receiving a downlink signal related to contention resolution from the base station in response to the uplink signal, wherein a transmission power of the uplink signal may be configured based on a power ramping counter and wherein a value of the power ramping counter may increase based on that a transmission spatial beam for the transmission of the uplink signal is configured identical to a transmission spatial beam related to transmission of a PRACH before the uplink signal.

As is apparent from the above description, the user equipment (UE) for use in a wireless communication system can smoothly transmit and receive signals for performing the 2-step random access channel (RACH) procedure.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
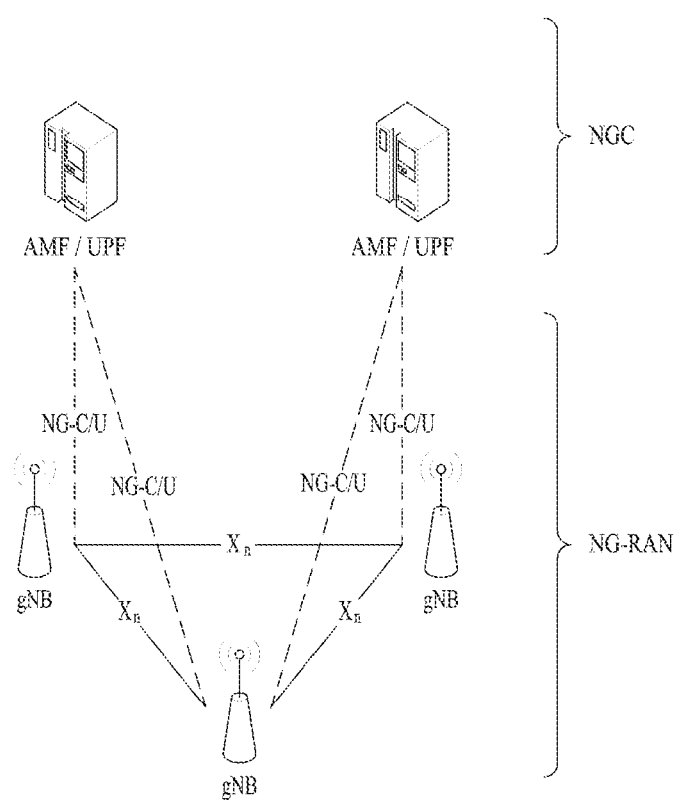
FIG. 1 is a view illustrating an example of a network architecture of a new radio (NR) system.

The configuration, operation, and other features of the present disclosure will be easily understood from embodiments of the present disclosure, examples of which are illustrated in the accompanying drawings. The following embodiments are examples in which the technical features of the present disclosure are applied to a $3^{rd}$ generation partnership project (3GPP) system.

While embodiments of the present disclosure are described in the context of long term evolution (LTE), long term evolution-advanced (LTE-A), and new radio access technology (NewRAT or NR) systems, they are merely examples. The embodiments of the present disclosure are applicable to any communication system corresponding to the above definition.

Further, the term used herein "base station (BS)" encompasses "remote radio head (RRH)", "evolved node B (eNode B or eNB)", "transmission point (TP)", "reception point (RP)", "relay", and so on.

The 3GPP communication standards define downlink (DL) physical channels corresponding to resource elements (REs) carrying information originated from a higher layer and DL physical signals corresponding to REs which are used in the physical (PHY) layer but do not carry information originated from a higher layer. For example, the DL physical channels include physical downlink shared channel (PDSCH), physical broadcast channel (PBCH), physical multicast channel (PMCH), physical control format indicator channel (PCFICH), physical downlink control channel (PDCCH), and physical hybrid automatic repeat request indicator channel (PHICH). The DL physical signals include, for example, reference signal (RS) and synchronization signal (SS). The RS is also called pilot, which is a signal of a predefined special waveform known to both a next-generation node B (gNB) and a user equipment (UE). For example, RSs include cell-specific RS, UE-specific RS (UE-RS), positioning RS (PRS), and channel state information (CSI) RS (CSI-RS). The 3GPP LTE/LTE-A standards define uplink (UL) physical channels corresponding to REs carrying information originated from a higher layer, and UL physical signals corresponding to REs which are used in the PHY layer but do not carry information originated from a higher layer. For example, the UL physical channels include physical uplink shared channel (PUSCH), physical uplink control channel (PUCCH), and physical random access channel (PRACH). The UL physical signals include demodulation reference signal (DMRS) for UL control and data signals, and sounding reference signal (SRS) used for UL channel measurement.

In the present disclosure, the PDCCH, PCFICH, PHICH, and PDSCH refer to sets of time-frequency resources or REs that carry downlink control information (DCI), a control format indicator (CFI), a DL acknowledgment/negative acknowledgment (ACK/NACK), and DL data, respectively. Further, the PUCCH, PUSCH, and PRACH refer to sets of time-frequency resources or REs that carry uplink control information (UCI), UL data, and a random access signal, respectively. In the present disclosure, particularly time-frequency resources or REs allocated to or belonging to the PDCCH, PCFICH, PHICH, PDSCH, PUCCH, PUSCH, and PRACH are referred to as PDCCH, PCFICH, PHICH, PDSCH, PUCCH, PUSCH, and PRACH resources or REs, respectively. When it is said that a UE transmits the PUCCH, PUSCH, or PRACH, this implies that the UE transmits UCI, UL data, or a random access signal on or through the PUSCH, PUCCH, or PRACH. Further, when it is said that the gNB transmits the PDCCH, PCFICH, PHICH, or PDSCH, this implies that the gNB transmits DL data or DCI on or through the PDCCH, PCFICH, PHICH, or PDSCH.

OFDM symbols, carriers, subcarriers, and REs allocated to or configured with the CRS, DMRS, CSI-RS, SRS, and UE-RS are referred to CRS, DMRS, CSI-RS, SRS, and UE-RS symbols, carriers, subcarriers, and REs, respectively. For example, an OFDM symbol allocated to or configured with a tracking reference signal (TRS) is referred to as a TRS symbol, a subcarrier allocated to or configured with the TRS is referred to as a TRS subcarrier, and an RE allocated to or configured with the TRS is referred to as a TRS RE. Further, a subframe configured for TRS transmission is referred to as a TRS subframe. A subframe carrying a broadcast signal is referred to as a broadcast subframe or a PBCH subframe, and a subframe carrying an SS (e.g., a primary synchronization signal (PSS) and/or a secondary synchronization signal (SSS)) is referred to as an SS subframe or a PSS/SSS subframe. An OFDM symbol, subcarrier, and RE allocated to or configured with the PSS/SSS are referred to as a PSS/SSS symbol, subcarrier, and RE, respectively.

In the present disclosure, a CRS port, a UE-RS port, a CSI-RS port, and a TRS port is an antenna port configured for CRS transmission, an antenna port configured for UE-RS transmission, an antenna port configured for CSI-RS transmission, and an antenna port configured for TRS transmission, respectively. Antenna ports configured for transmission of CRSs may be distinguished from each other by the positions of REs occupied by the CRSs according to CRS ports. Antenna ports configured for transmission of UE-RSs may be distinguished from each other by the positions of REs occupied by the UE-RSs according to UE-RS ports. Antenna ports configured for transmission of CSI-RSs may be distinguished from each other by the positions of REs occupied by the CSI-RSs according to CSI-RS ports. Accordingly, the terms CRS port, UE-RS port, CSI-RS port, and TRS port are used in the meaning of patterns of REs occupied by the CRS, UE-RS, the CSI-RS, and the TRS, respectively.

FIG. 1 is a view illustrating an example of a network architecture of an NR system.

The network of the NR system is largely composed of a next-generation radio access network (NG-RAN) and a next-generation core (NGC) network. NGC is also referred to as 5GC.

Referring to FIG. 1, the NG-RAN includes gNBs that provide a UE with user plane protocol (e.g., SDAP, PDCP, RLC, MAC, and PHY) and control plane protocol (e.g., RRC, PDCP, RLC, MAC, and PHY) terminations. The gNBs are interconnected through an Xn interface. The gNBs are connected to the NGC through an NG interface. For example, the gNBs are connected to a core network node having an access and mobility management function (AMF) through an N2 interface, which is one of interfaces between the gNBs and the NGC and to a core network node having a user plane function (UPF) through an N3 interface, which is another interface between the gNB and the NGC. The AMF and the UPF may be implemented by different core network devices or may be implemented by one core network device. In the RAN, signal transmission/reception between a BS and a UE is performed through a radio interface. For example, signal transmission/reception between the BS and the UE in the RAN is performed through a physical resource (e.g., a radio frequency (RF)). In contrast, signal transmission/reception between the gNB and the network functions (e.g., AMF and UPF) in the core network may be performed through physical connection (e.g., optical cable) between the core network nodes or through logical connection between the core network functions, rather than through the radio interface.

Figure 2:
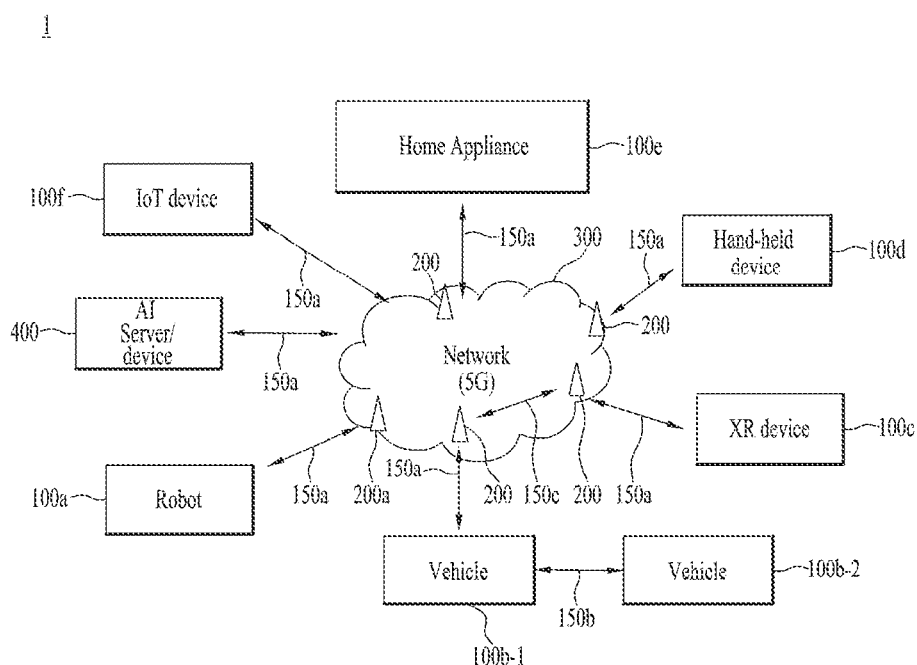
FIG. 2 is a diagram illustrating an exemplary wireless communication environment to which embodiments of the present disclosure are applicable.

FIG. 2 illustrates a communication system 1 applied to the present disclosure.

Referring to FIG. 2, the communication system 1 applied to the present disclosure includes wireless devices, BSs, and a network. The wireless devices are devices performing communication using RAT (e.g., 5G NR or LTE) and may be referred to as communication/radio/5G devices. The wireless devices may include, but not limited to, a robot 100a, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television, a smartphone, a computer, a wearable, a home appliance, a digital signage, a vehicle, a robot, and so on. The hand-held device may include a smartphone, a smart pad, a wearable device (e.g., a smart watch or a smart glasses), and a computer (e.g., a laptop). The home appliance may include a television, a refrigerator, and a washing machine. The IoT device may include a sensor and a smart meter. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200 or the network 300, the wireless devices 100*a* to 100*f* may perform direct communication (e.g., sidelink communication) with each other without intervention of the BSs or the network. For example, the vehicles 100*b*-1 and 100*b*-2 may perform direct communication (e.g. V2V/V2X communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f* and the BSs 200, or between BSs 200. The wireless communication/connections may be established through various RATs (e.g., 5G NR) such as UL/DL communication 150*a*, sidelink communication 150*b* (or, D2D communication), or inter-BS communication 150*c* (e.g. relay and integrated access backhaul (IAB)). Radio signals may be transmitted and received between the wireless devices, between the wireless devices and the BSs, and between the BSs through the wireless communication/connections 150*a*, 150*b*, and 150*c*. For example, signals may be transmitted and received on various physical signals through the wireless communication/connections 150*a*, 150*b*, and 150*c*. To this end, at least a part of various configuration information configuring processes, various signal processing processes (e.g., channel encoding/decoding, modulation/demodulation, and resource mapping/demapping), and resource allocating processes, for transmitting/receiving radio signals may be performed based on the various proposals of the present disclosure.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Figure 3A:
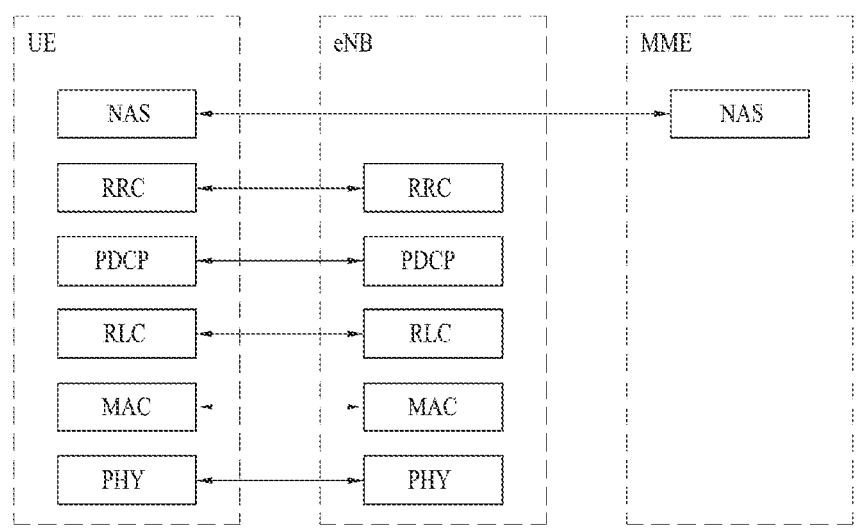
FIGS. 3A and 3B are diagrams illustrating a control-plane protocol stack and a user-plane protocol stack in a radio interface protocol architecture conforming to a 3rd generation partnership project (3GPP) radio access network standard between a user equipment (UE) and an evolved UMTS terrestrial radio access network (E-UTRAN)
Figure 3B:
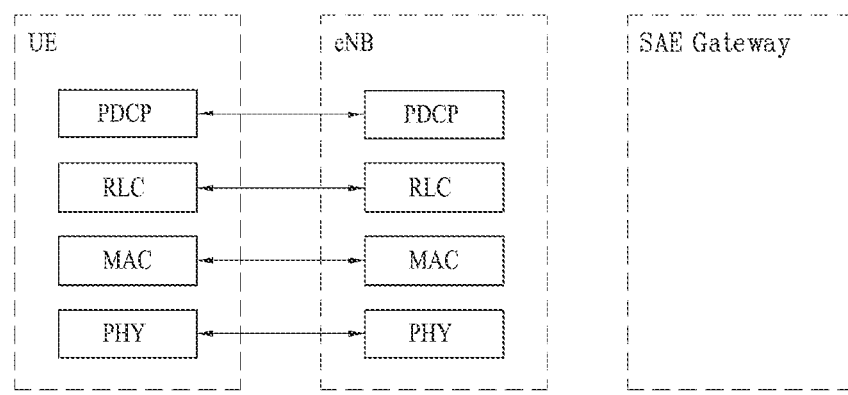

FIGS. 3A and 3B illustrate control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (Ut).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 4:
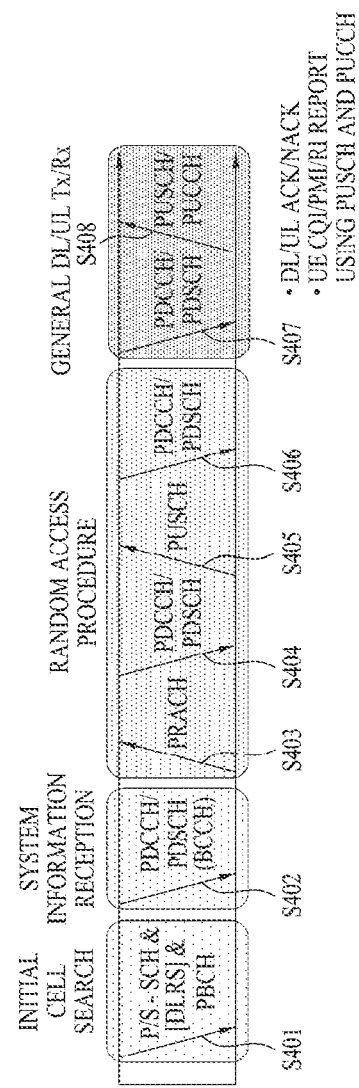
FIG. 4 is a diagram illustrating physical channels and a general signal transmission method using the physical channels in a 3GPP system.

FIG. 4 illustrates physical channels and a general method for transmitting signals on the physical channels in the 3GPP system.

Referring to FIG. 4, when a UE is powered on or enters a new cell, the UE performs initial cell search (S401). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S402).

If the UE initially accesses the eNB or has no radio resources for signal transmission to the eNB, the UE may perform a random access procedure with the eNB (S403 to S406). In the random access procedure, the UE may transmit a predetermined sequence as a preamble on a physical random access channel (PRACH) (S403 and S405) and may receive a response message to the preamble on a PDCCH and a PDSCH associated with the PDCCH (S404 and S406). In the case of a contention-based RACH, the UE may additionally perform a contention resolution procedure.

After the above procedure, the UE may receive a PDCCH and/or a PDSCH from the eNB (S407) and transmit a physical uplink shared channel (PUSCH) and/or a physical uplink control channel (PUCCH) to the eNB (S408), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

In NR, various numerologies or subcarrier spacings (SCSs) may be supported to support various 5G services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 may be a sub 6 GHz range, and FR2 may be an above 6 GHz range called millimeter wave (mmW).

Table 1 below defines the NR frequency bands.

TABLE 1

| Frequency Range Designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Uplink Power Control>

In a wireless communication system, it may be necessary to increase or decrease Transmission (Tx) power of a terminal (e.g., a User Equipment (UE) and/or a mobile device) depending on a situation. As described above, controlling the transmit power of the UE and/or the mobile device may be referred to as uplink power control. For example, a transmission (Tx) power control method may be applied to satisfy requirements (e.g., a Signal-to-Noise Ratio (SNR), a Bit Error Ratio (BER), a Block Error Ratio (BLER), etc.) at a base station (e.g., gNB, eNB, etc.).

As described above, the power control may be performed by an open-loop power control method or a closed-loop power control method.

Specifically, the open-loop power control method refers to a method of controlling transmit power without feedback from a TX device (e.g., a base station, etc.) to a Reception (Rx) device (e.g., a UE, etc.) and/or feedback from the RX device to the Tx device. For example, a UE may receive a specific channel/signal (pilot channel/signal) from a Base Station (BS) and estimate the strength of Rx power using the same. Thereafter, the UE may control the transmit power using the estimated strength of the Rx power.

On the other hand, the closed loop power control method refers to a method of controlling transmit power based on feedback from a Tx device to a Rx device and/or feedback from the Rx device to the Tx device. For example, a BS receives a specific channel/signal from a UE and determines an optimal power level of the UE based on a power level measured via the received specific channel/signal, SNR, BER, BLER, etc. The BS transmits information (i.e., feedback) on the determined optimal power level to the UE through a control channel or the like, and the corresponding UE may control the transmit power using the feedback provided by the BS.

Hereinafter, a power control method for cases in which a UE and/or a mobile device perform uplink transmission to a BS in a wireless communication system will be described in detail. Specifically, described are power control methods for transmissions of: 1) uplink data channel (e.g., Physical Uplink Shared Channel (PUSCH); 2) uplink control channel (e.g., Physical Uplink Control Channel (PUCCH); 3) Sounding Reference Signal (SRS); and 4) random access channel (e.g., Physical Random Access Channel (PRACH). In this case, a transmission occasion (i.e., Tx time unit) (i) for PUSCH, PUCCH, SRS, and/or PRACH may be defined by a slot index n_s in a frame of a System Frame Number (SFN), a first symbol S in a slot, the number L of consecutive symbols, and the like.

(1) Power Control of UL Data Channel

Regarding power control of an uplink data channel, a power control method will be described below based on a case where a UE performs PUSCH transmission for convenience of description. Yet, the corresponding power control method is not limited to the PUCSH transmission and may be extended and applied to other uplink data channels supported by a wireless communication system.

In case of PUSCH transmission on an active UL Band-Width Part (BWP) of a carrier (f) of a serving cell (c), a UE may calculate a linear power value of Tx power determined by Equation 1 below. Thereafter, the UE may control Tx power based on the calculated linear power value in consideration of the number of antenna ports, the number of SRS ports, and/or the like.

Specifically, when a UE performs PUSCH transmission on an active UL BWP (b) of a carrier (f) of a serving cell (c) using a parameter set configuration based on an index j and a PUSCH power control adjustment state based on an index 1, the UE may determine a PUSCH Tx power $P_{PUSCH,b,f,c}$ (i,j,$q_d$,l) (dBm) on a PUSCH transmission occasion (i).

$$P_{PUSCH,b,f,c}(i, j, q_d, l) = \min\left\{\begin{array}{l} P_{CMAX,f,c}(i), \\ P_{0\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array}\right\}$$ [Equation 1]

In Equation 1, an index j indicates an index for an open-loop power control parameter (e.g., Po, alpha (α), etc.), and maximum 32 parameter sets may be configured per cell. An index q_d indicates an index of a DL RS resource for a PathLoss (PL) measurement (e.g., $PL_{b,f,c}(q_d)$), and maximum 4 measurement values may be configured per cell. An index 1 indicates an index for a closed-loop power control process, and maximum 2 processes may be configured per cell.

In addition, Po (e.g., $P_{O\_PUSCH,b,f,c}(j)$) is a parameter broadcasted as a part of system information and may indicate a target Rx power on an Rx side. The corresponding Po value may be configured in consideration of throughput of a UE, capacity of a cell, noise, interference, and/or the like. In addition, alpha (e.g., $\alpha_{b,f,c}(j)$) may indicate a rate of performing compensation for a pathloss. The alpha may be configured as a value ranging 0 to 1, and a full pathloss compensation or a fractional pathloss compensation may be performed depending of the configured value. In this case, the alpha value may be configured in consideration of inter-UE interference, data rate, and/or the like. In addition, $P_{CMAX,f,c}(i)$ may indicate a configured UE transmit power. For example, the configured UE transmit power may be interpreted as 'configured maximum UE output power)' defined in 3GPP TS 38.101-1 and/or TS 38.101-2. In addition, $M_{RB,b,f,c}^{PUSCH}(i)$ may indicate a bandwidth of PUSCH resource allocation represented as the number of Resource Blocks (RBs) for a PUSCH transmission occasion based on subcarrier spacing (O. In addition, $f_{b,f,c}(i,l)$ related to a PUSCH power control adjustment state may be configured or indicated based on a TPC command field of DCI (e.g., DCI format 0_0, DCI format 0_1, DCI format 2_2, DCI format 2_3, etc.).

In this case, a Radio Resource Control (RRC) parameter (e.g., SRI-PUSCHPowerControl-Mapping, etc.) may indicate the linkage between an SRI (SRS Resource Indicator) field of Downlink Control Information (DCI) and the aforementioned indexes j, q_d, 1 and the like. So to speak, the aforementioned indexes j, q_d, 1 and the like may be associated with a beam, a panel, a spatial domain transmission filter, and/or the like based on specific information. Through this, a PUSCH Tx power control in unit of a beam, a panel, and/or a spatial domain transmission filter may be performed.

The above-described parameters and/or information for the PUSCH power control may be individually (i.e., independently) configured per BWP. In this case, the corresponding parameters and/or information may be configured or indicated through higher layer signaling (e.g., RRC signaling, Medium Access Control-Control Element (MAC-CE), etc.), DCI and/or the like. For example, the parameters and/or information for the PUSCH power control may be delivered through RRC signaling PUSCH-ConfigCommon, PUSCH-PowerControl, etc.

(2) Power Control of Uplink Control Channel

Regarding power control of an uplink data channel, a power control method will be described below based on a case where a UE performs PUCCH transmission for convenience of description. Yet, the corresponding power control method is not limited to the PUCCH transmission and may be extended and applied to other uplink data channels supported by a wireless communication system.

When a UE performs PUCCH transmission on an active UL BWP (b) of a carrier (f) of a primary cell (or a secondary cell) (c) using a PUCCH power control adjustment state based on an index 1, the UE may determine a PUCCH transmit power $P_{PUCCH,b,f,c}(i,q_u,q_d,l)$ (dBm) on a PUCCH transmission occasion (i) based on Equation 2 below.

$$P_{PUCCH,b,f,c}(i, q_u, q_d, l) = \min\left\{\begin{array}{l} P_{CMAX,f,c}(i), \\ P_{0\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{array}\right\}$$ [Equation 2]

In Equation 2, q_u indicates an index for an open-loop power control parameter (e.g., Po, etc.), and maximum 8 parameter values may be configured per cell. An index q_d indicates an index of a DL RS resource for a PathLoss (PL) measurement (e.g., $PL_{b,f,c}(q_d)$), and maximum 4 measurement values may be configured per cell. An index 1 indicates an index for a closed-loop power control process, and maximum 2 processes may be configured per cell.

In addition, Po (e.g., $P_{O\_PUCCH,b,f,c}(q_u)$) is a parameter broadcasted as a part of system information and may indicate a target Rx power on an Rx side. The corresponding Po value may be configured in consideration of throughput of a UE, capacity of a cell, noise, interference, and/or the like. In addition, $P_{CMAX,f,c}(i)$ may indicate a configured UE transmit power. For example, the configured UE transmit power may be interpreted as 'configured maximum UE output power)' defined in 3GPP TS 38.101-1 and/or TS 38.101-2. In addition, $M_{RB,b,f,c}^{PUSCH}(i)$ may indicate a bandwidth of PUCCH resource allocation represented as the number of Resource Blocks (RBs) for a PUCCH transmission occasion based on subcarrier spacing (O. In addition, a delta function (e.g., $\Delta_{F\_PUCCH}(F)$, $\Delta_{TF,b,f,c}(i)$) may be configured in consideration of a PUCCH format (e.g., PUCCH formats 0, 1, 2, 3, 4, etc.). In addition, $g_{b,f,c}(i,l)$ related to a PUCCH power control adjustment state may be configured or indicated based on a TPC command field of DCI (e.g., etc.) received or detected by the UE.

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate the linkage between a PUCCH resource and the aforementioned indexes q_u and q_d. For example, a PUCCH spatial relation Activation/Deactivation command in MAC-CE may activate or deactivate the linkage between the PUCCH resource and the aforementioned indexes q_u, q_d and l based on an RRC parameter PUCCH-SpatialRelationInfo. So to speak, the aforementioned indexes q_u, q_d, l and the like may be associated with a beam, a panel, a spatial domain transmission filter, and/or the like based on specific information. Through this, a PUCCH Tx power control in unit of a beam, a panel, and/or a spatial domain transmission filter may be performed.

The above-described parameters and/or information for the PUCCH power control may be individually (i.e., independently) configured per BWP. In this case, the corresponding parameters and/or information may be configured or indicated through higher layer signaling (e.g., RRC signaling, Medium Access Control-Control Element (MAC-CE), etc.), DCI and/or the like. For example, the parameters and/or information for the PUCCH power control may be delivered through RRC signaling PUCCH-ConfigCommon, PUCCH-PowerControl, etc.

(3) Power Control of Random Access Channel

When a UE performs PRACH transmission on an active UL BWP (b) of a carrier (f) of a serving cell (c), the UE may determine a PRACH transmit power $P_{PRACH,b,f,c}(i)$ (dBm) on a PRACH transmission occasion (i) based on Equation 3 below.

$$P_{PRACH,b,f,c}(i) = \min\{P_{CMAX,f,c}(i), P_{PRACH,target,f,c} + PL_{b,f,c}\}$$ [Equation 3]

In Equation 3, $P_{CMAX,f,c}(i)$ may indicate a configured UE transmit power. For example, the configured UE transmit power may be interpreted as 'configured maximum UE output power' defined in 3GPP TS 38.101-1 and/or TS38.101-2. In addition, $P_{PRACH,target,f,c}$ indicates a PRACH target reception power provided through higher layer signaling (e.g., RRC signaling, MAC-CE, etc.) for an active UL BWP. In addition $PL_{b,f,c}$ indicates a pathloss for an active UL BWP, and may be determined based on a DL RS associated with PRACH transmission on an active DL BWP of a serving cell (c). For example, the UE may determine a pathloss related to PRACH transmission based on Synchronization Signal/Physical Broadcast Channel (SS/PBCH) block and the like associated with the PRACH transmission.

The above-described parameters and/or information for the PRACH power control may be individually (i.e., independently) configured per BWP. In this case, the corresponding parameters and/or information may be configured or indicated through higher layer signaling (e.g., RRC signaling, MAC-CE, etc.). For example, the parameters and/or information for the PRACH power control may be delivered through RRC signaling RACH-ConfigGeneric, etc.

(4) Tx Power Control Procedure

Figure 5:
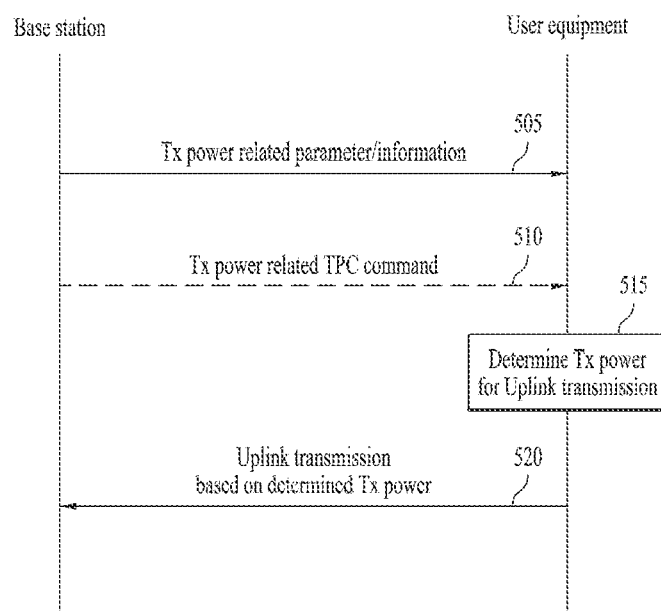
FIG. 5 is a diagram to describe an embodiment of a procedure for controlling an uplink transmit power.

FIG. 5 is a diagram to describe an embodiment of a procedure for controlling an uplink transmit power.

First of all, a User Equipment (UE) may receive a parameter and/or information related to a Transmission (Tx) power from a Base Station (BS) [605]. In this case, the UE may receive the parameter and/or information through higher layer signaling (e.g., RRC signaling, MAC-CE, etc.). For example, with regard to PUSCH transmission, PUCCH transmission, SRS transmission, and/or PRACH transmission, the UE may receive the parameter and/or information related to the aforementioned Tx power control.

Thereafter, the UE may receive a TPC command related to a Tx power from the BS [510]. In this case, the UE may receive the corresponding TPC command through lower layer signaling (e.g., DCI, etc.). For example, with respect to PUSCH transmission, PUCCH transmission and/or SRS transmission, as described above, the UE may receive information on a TPC command, which is to be used for determination of a power control adjustment state and the like, through a TPC command field of a predetermined DCI format. Yet, in case of PRACH transmission, the corresponding step may be skipped.

Thereafter, based on the parameter, information, and/or TPC command received from the BS, the UE may determine (or calculate) a Tx power for Uplink (UL) transmission [515]. For example, based on the above-described method (e.g., Equation 1, Equation 2, Equation 3, etc.), the UE may determine a PUSCH Tx power, a PUCCH Tx power, an SRS Tx power, and/or a PRACH Tx power. And/or, like such a situation as carrier aggregation, if two or more UL channels and/or signals need to be transmitted by overlapping with each other, the UE may determine a Tx power for UL transmission in consideration of the above-described priority and the like.

Thereafter, based on the determined (or calculated) Tx power, the UE may perform transmission of one or more UL channels and/or signals (e.g., PUSCH, PUCCH, SRS, PRACH, etc.) to the BS [520].

Figure 6:
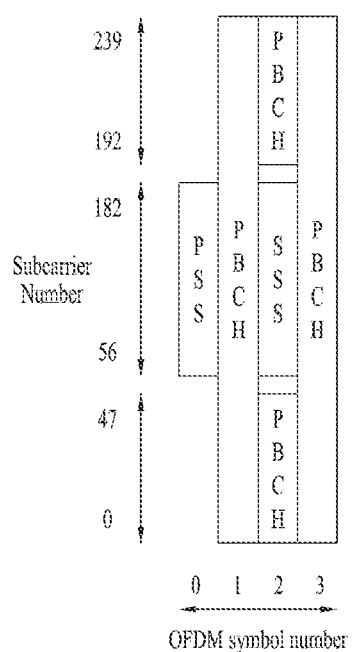
FIGS. 6 to 11 are diagrams illustrating the composition of a synchronization signal/physical broadcast channel (SS/PBCH) block and a method of transmitting an SS/PBCH block.

FIG. 6 is a diagram illustrating a synchronization signal block (SSB) structure. A UE may perform cell search, system information acquisition, beam alignment for initial access, DL measurement, and so on based on an SSB. The term SSB is interchangeably used with SS/PBCH block.

Referring to FIG. 6, an SSB includes a PSS, an SSS, and a PBCH. The SSB includes four consecutive OFDM symbols, which carry the PSS, PBCH, SSS/PBCH, and PBCH, respectively. Each of the PSS and the SSS includes one OFDM symbol by 127 subcarriers, and the PBCH includes three OFDM symbols by 576 subcarriers. Polar coding and quadrature phase shift keying (QPSK) are applied to the PBCH. The PBCH includes data REs and DMRS REs in each OFDM symbol. There are three DMRS REs per RB, with three data REs between every two adjacent DMRS REs.

Cell Search

Cell search is a process of acquiring time/frequency synchronization with a cell and detecting the cell ID (e.g., physical layer cell ID (POD)) of the cell at a UE. The PSS is used to detect a cell ID in a cell ID group, and the SSS is used to detect the cell ID group. The PBCH is used to detect an SSB (time) index and a half-frame.

The cell search procedure of the UE may be summarized in Table 3 below.

TABLE 3

| Type of Signals | Operations |
| --- | --- |
| 1$^{st}$ step — PSS | SS/PBCH block (SSB) symbol timing acquisition Cell ID detection within a cell ID group (3 hypothesis) |
| 2$^{nd}$ Step — SSS | Cell ID group detection (336 hypothesis) |
| 3$^{rd}$ Step — PBCH DMRS | SSB index and Half frame (HF) index (Slot and frame boundary detection) |
| 4$^{th}$ Step — PBCH | Time information (80 ms, System Frame Number (SFN), SSB index, HF) Remaining Minimum System Information (RMSI) Control resource set (CORESET)/Search space configuration |

TABLE 3-continued

| | Type of Signals | Operations |
|---|---|---|
| 5th Step | PDCCH and PDSCH | Cell access information RACH configuration |

Figure 7:
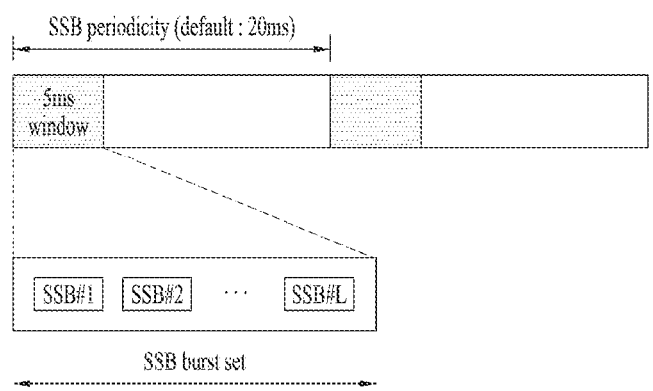

FIG. 7 illustrates exemplary SSB transmission.

Referring to FIG. 7, an SSB is transmitted periodically according to an SSB periodicity. A default SSB periodicity that the UE assumes during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at the start of an SSB period. The SSB burst set includes a 5-ms time window (i.e., a half-frame), and an SSB may be transmitted up to L times in the SSB burst set. The maximum allowed transmission number L of an SSB may be given as follows according to the frequency band of a carrier. One slot includes up to two SSBs.

For frequency range of up to 3 GHz, L=4
For frequency range from 3 GHz to 6 GHz, L=8
For frequency range from 6 GHz to 52.6 GHz, L=64

The time positions of SSB candidates in an SS burst set may be defined as follows according to SCSs. The time positions of SSB candidates are indexed with (SSB indexes) 0 to L−1 in time order in the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for the carrier frequency equal to or lower than 3 GHz, and n=0, 1 for the carrier frequency of 3 GHz to 6 GHz.

Case C—30-kHz SCS: The indexes of the first symbols of candidate SSBs are given as {2, 8}+14*n where n=0, 1 for the carrier frequency equal to or lower than 3 GHz, and n=0, 1, 2, 3 for the carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for the carrier frequency above 6 GHz.

Figure 8:
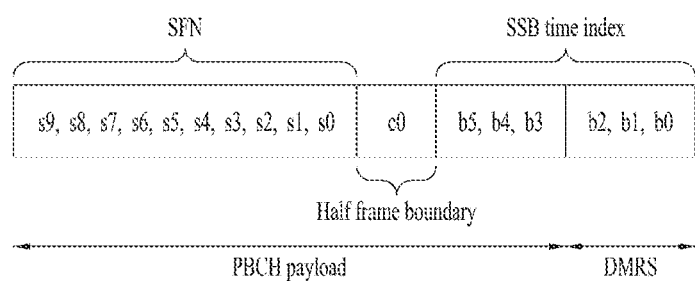

FIG. 8 illustrates acquisition of DL time synchronization information at a UE.

The UE may acquire DL synchronization by detecting an SSB. The UE may identify the structure of an SSB burst set based on the index of the detected SSB and thus detect a symbol, slot, or half-frame boundary. The number of a frame or half-frame to which the detected SSB belongs to may be identified by SFN information and half-frame indication information.

Specifically, the UE may acquire 10-bit SFN system information s0 to s9 from the PBCH. 6 bits out of the 10-bit SFN information is obtained from a master information block (MIB), and the remaining 4 bits are obtained from a PBCH TB.

The UE may then acquire 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may acquire an SSB index based on the DMRS sequence and PBCH payload. SSB candidates are indexed with 0 to L−1 in time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

System Information Acquisition

Figure 9:
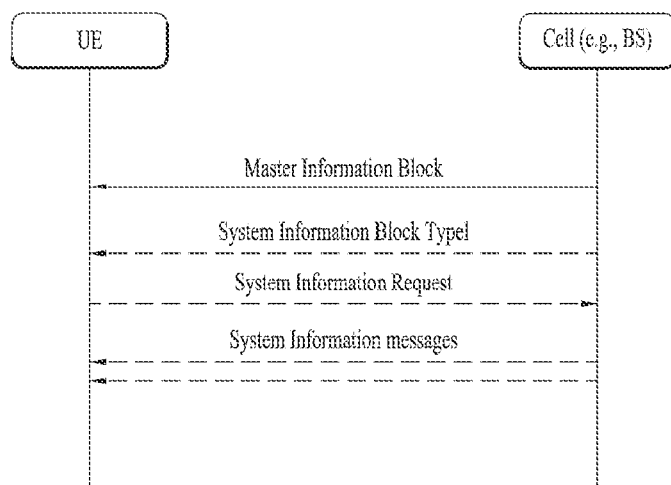

FIG. 9 illustrates a system information (SI) acquisition procedure. The UE may acquire access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to acquire the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MM. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBS (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Beam Alignment

Figure 10:
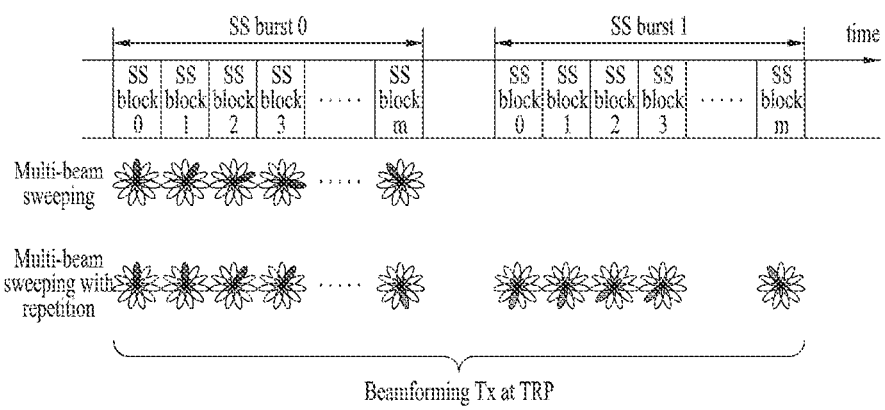

FIG. 10 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). An SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Measurement and Rate Matching

Figure 11:
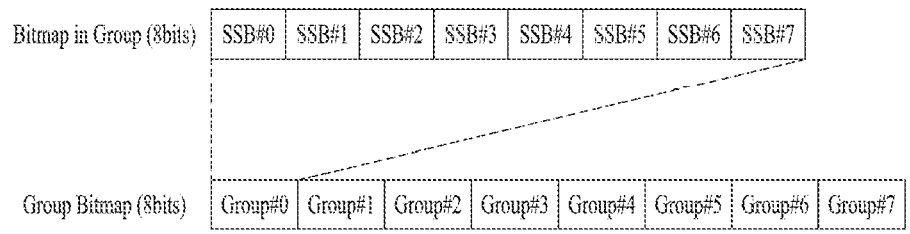

FIG. 11 illustrates an exemplary method of indicating actually transmitted SSBs, SSB tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 11. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

<Unlicensed Band/Shared Spectrum System>

Figure 12A:
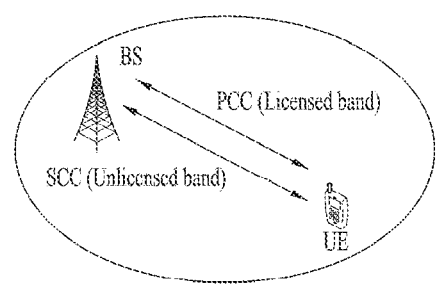
FIGS. 12A to 14 are diagrams to describe channel transmission on an unlicensed band.
Figure 12B:
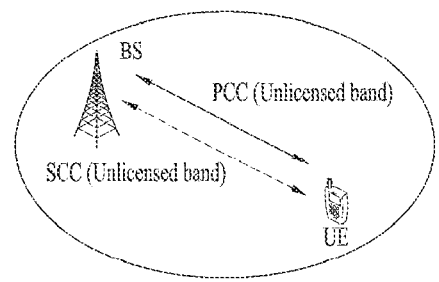

FIGS. 12A and 12B are diagrams illustrating an exemplary wireless communication system supporting an unlicensed band to which various embodiments of the present disclosure are applicable.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as a U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., component carrier (CC)) is collectively referred to as a cell.

As illustrated in FIG. 12A, when the UE and the BS transmit and receive signals in carrier-aggregated LCC and UCC, the LCC may be configured as a primary CC (PCC) and the UCC may be configured as a secondary CC (SCC).

As illustrated in FIG. 12B, the UE and the BS may transmit and receive signals in one UCC or a plurality of carrier-aggregated LCC and UCC. That is, the UE and the BS may transmit and receive signals only in the UCC(s) without the LCC. An operation of transmitting and receiving a signal in an unlicensed band as described in various embodiments of the present disclosure may be performed based on all the deployment scenarios described above (unless otherwise stated).

1. Radio Frame Structure for Unlicensed Band

LTE frame structure type 3 or an NR frame structure may be used for operation in an unlicensed band. The configuration of OFDM symbols occupied for a UL/DL signal transmission in the frame structure for the unlicensed band may be configured by the BS. Herein, an OFDM symbol may be replaced with an SC-FDM(A) symbol.

For a DL signal transmission in the unlicensed band, the BS may indicate the configuration of OFDM symbols used in subframe #n to the UE by signaling. In the following description, a subframe may be replaced with a slot or a TU.

Specifically, in the wireless communication system supporting the unlicensed band, the UE may assume (or identify) the configuration of OFDM symbols occupied in subframe #n by a specific field (e.g., a Subframe configuration for LAA field) in DCI received in subframe #n−1 or subframe #n from the BS.

Table 3 illustrates an exemplary method of indicating the configuration of OFDM symbols used for transmission of a DL physical channel and/or physical signal in a current and/or next subframe by the Subframe configuration for LAA field in the wireless communication system.

TABLE 3

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |

TABLE 3-continued

| Value of 'Subframe configuration for LAA' field in current subframe | Configuration of occupied OFDM symbols (current subframe, next subframe) |
|---|---|
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For a UL signal transmission in the unlicensed band, the BS may transmit information about a UL transmission period to the UE by signaling.

Specifically, in an LTE system supporting an unlicensed band, the UE may acquire 'UL duration' and 'UL offset' information for subframe #n from a 'UL duration and offset' field in detected DCI.

Table 4 illustrates an exemplary method of indicating a UL offset and UL duration configuration by the UL duration and offset field in the wireless communication system.

TABLE 4

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

2. Overview of Channel Access Procedures

Unless otherwise noted, the definitions below are applicable to terminologies used in the following description of various embodiments of the present disclosure.

A channel refers to a carrier or a part of a carrier including a set of consecutive RBs in which a channel access procedure is performed in a shared spectrum.

A channel access procedure may be a procedure based on sensing that evaluates the availability of a channel for performing a transmission. A basic unit for sensing is a sensing slot with a duration of $T_{sl}=9$ us. The sensing slot duration may be considered to be idle if the BS or the UE senses the channel during the sensing slot duration, and determines that detected power for at least 4 us within the sensing slot duration is less than an energy detection threshold $X_{Thresh}$. Otherwise, the sensing slot duration $T_{sl}$ may be considered to be busy.

Channel occupancy refers to transmission(s) on channel(s) from the BS/UE after performing a corresponding channel access procedure in this subclause.

A channel occupancy time refers to the total time during which the BS/UE and any BS/UE sharing channel occupancy performs transmission(s) on a channel after the BS/UE performs the corresponding channel access procedure described in this subclause. For determining a channel occupancy time, if a transmission gap is less than or equal to 25 us, the gap duration may be counted in the channel occupancy time. The channel occupancy time may be shared for transmission between the BS and corresponding UE(s).

3. Downlink Channel Access Procedure

For a DL signal transmission in an unlicensed band, the BS may perform a DL channel access procedure (CAP) for the unlicensed band as follows.

3.1. Type 1 DL Channel Access Procedures

This subclause describes CAPs to be performed by the BS, in which a time duration spanned by sensing slots sensed to be idle before DL transmission(s) is random. This subclause is applicable to the following transmissions:

Transmission(s) initiated by a BS including a PDSCH/PDCCH/EPDCCH, or

Transmission(s) initiated by a BS including a unicast PDSCH with user plane data, or a unicast PDSCH with user plane data and a unicast PDCCH scheduling user plane data, or Transmission(s) initiated by a BS with only a discovery burst or with a discovery burst multiplexed with non-unicast information, where the duration of the transmission(s) is larger than 1 ms or the transmission causes the discovery burst duty cycle to exceed 1/20.

ABS may sense whether a channel is in an idle state during a sensing slot period of a defer duration Td, and perform a transmission after a counter N becomes 0 in the following step 4. In this case, the counter N is adjusted by channel sensing for an additional sensing slot duration according to the following procedure.

1) Set to N=Ninit. Here, Ninit is a random number uniformly distributed between 0 and CWp. Then, move to step 4.

2) If N>0 and the BS chooses to decrease the counter, set to N=N−1.

3) Sense a channel for an additional sensing slot duration. In this case, when the additional sensing slot duration is idle, move to step 4. If not, move to step 5.

4) If N=0, stop the corresponding procedure. Otherwise, move to step 2.

5) Sense a channel if a busy sensing slot in the additional defer duration Td is detected or until all sensing slots in the additional defer duration Td are detected as idle.

6) If a corresponding channel is sensed as idle during all sensing slot durations of the additional defer duration Td, move to step 4. Otherwise, move to step 5.

Figure 13:
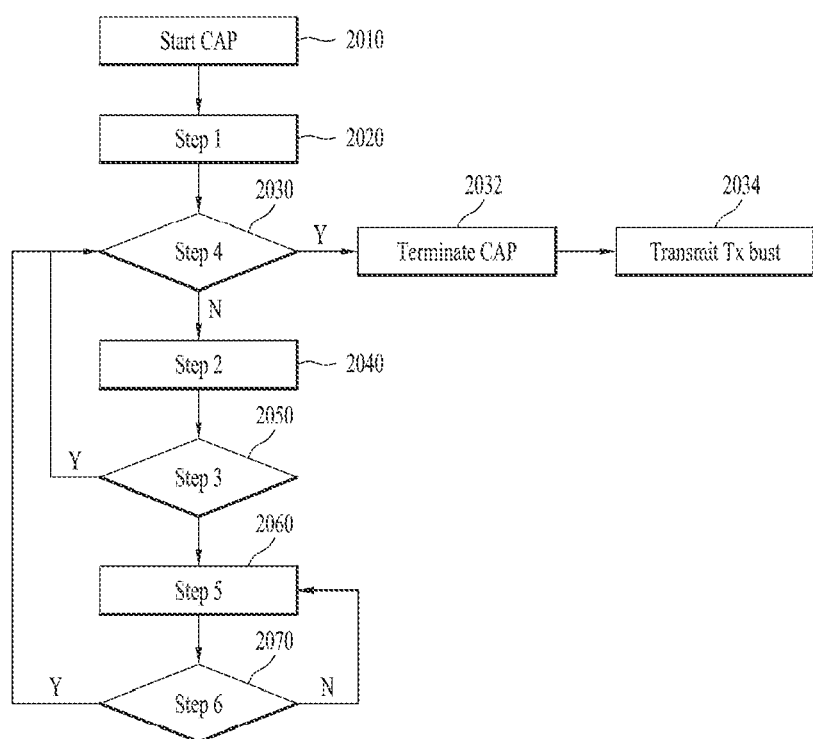

FIG. 13 is a diagram illustrating a DL CAP for transmission in an unlicensed band, to which various embodiments of the present disclosure are applicable.

A Type 1 DL CAP for transmission in an unlicensed band, to which various embodiments of the present disclosure are applicable may be summarized as follows.

For a DL transmission, a transmission node (e.g., a BS) may initiate a CAP (2010).

The BS may randomly select a backoff counter N within a contention window (CW) according to step 1. N is set to an initial value $N_{init}$ (2020). $N_{init}$ is a random value selected between 0 and $CW_p$.

Subsequently, when the backoff counter value N is 0 according to step 4 (2030; Y), the BS terminates the CAP (2032). The BS may then perform a transmission (Tx) burst transmission (2034). On the contrary, when the backoff counter value N is not 0 (2030; N), the BS decrements the backoff counter value by 1 according to step 2 (2040).

Subsequently, the BS checks whether the channel is idle (2050). If the channel is idle (2050; Y), the BS determines whether the backoff counter value is 0 (2030).

On the contrary, when the channel is not idle, that is, the channel is busy in operation 2050 (2050; N), the BS determines whether the channel is idle during a longer defer duration $T_d$ (25 usec or longer) than a sensing slot duration (e.g., 9 usec) (2060). If the channel is idle during the defer duration (2070; Y), the BS may resume the CAP.

For example, when the backoff counter value $N_{init}$ is 10 and the channel is determined to be idle after the backoff counter value is decremented to 5, the BS senses the channel during the defer duration and determines whether the channel is idle. If the channel is idle during the defer duration, the BS may resume the CAP from the backoff counter value 5 (or from the backoff counter value 4 obtained by decrementing the backoff counter value 5 by 1), instead of setting the backoff counter value $N_{init}$.

On the other hand, when the channel is busy during the defer duration (2070; N), the BS determines again whether the channel is idle during a new defer duration by performing step 2060 again.

If the BS has not performed a transmission after step 4 in the above procedure, the BS may perform the transmission on the channel, if the following condition is satisfied:

If the BS is ready to transmit and the channel is sensed to be idle during at least a sensing slot duration $T_{sl}$, and if the channel has been sensed to be idle during all the sensing slot durations of a defer duration $T_d$ immediately before this transmission.

On the contrary, if the channel has not been sensed to be idle during the sensing slot duration $T_{sl}$ when the BS first senses the channel after it is ready to transmit or if the channel has not been sensed to be idle during any of the sensing slot durations of the defer duration $T_d$ immediately before this intended transmission, the BS proceeds to step 1 after sensing the channel to be idle during the sensing slot durations of the defer duration $T_{sl}$.

The defer duration $T_d$ includes a duration $T_f$ (=16 us) immediately followed by $m_p$ consecutive sensing slot durations. Each sensing slot duration $T_{sl}$ is 9 us and the duration $T_f$ includes an idle sensing slot duration $T_{sl}$ at the start of the duration $T_f$.

Table 5 illustrates that mp, a minimum CW, a maximum CW, a maximum channel occupancy time (MCOT), and an allowed CW size applied to a CAP vary according to a channel access priority class.

TABLE 5

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

3.2. Type 2 DL Channel Access Procedures 3.2.1. Type 2A DL Channel Access Procedure The BS may perform a DL transmission immediately after sensing a corresponding channel to be idle during at least a sensing duration $T_{short\_dl}$ (=25 us). $T_{short\_dl}$ includes a duration $T_f$ (=16 us) following one sensing slot duration. $T_f$ includes a sensing slot at the start of $T_f$. If two sensing slots within $T_{short\_dl}$ are sensed to be idle, the channel is considered to be idle for $T_{short\_dl}$.

3.2.2. Type 2B DL Channel Access Procedure

ABS may perform a transmission immediately after a corresponding channel is sensed as idle during Tf=16 us. Tf includes a sensing slot occurring within last 9 us of Tf. When the channel is sensed to be in an idle state at least total 5 us or more along with sensing of at least 4 us occurring in the sensing slot, the channel is considered as idle during Tf.

3.2.3. Type 2C DL Channel Access Procedure

When a BS follows the procedure in this section to perform a transmission, the BS does not sense a channel before performing the transmission. A duration corresponding to the transmission is maximum 584 us.

4. Channel Access Procedure for Transmission(s) on Multiple Channels

The BS may access multiple channels on which a transmission is performed in one of the following Type A and Type B procedures.

4.1. Type A Multi-Carrier Access Procedures

According to the procedure described in this subclause, the BS performs channel access on each channel $c_i \in C$ where C is a set of channels that the BS intends to transmit, i=0, 1, . . . q−1, and q is the number of channels to be transmitted by the BS.

A counter N considered in a CAP is determined for each channel $c_i$, and in this case, the counter for each channel is represented as $N_{c_i}$.

4.1.1. Type A1 Multi-Carrier Access Procedure

The counter N considered in the CAP is determined independently for each channel $c_i$, and the counter for each channel is represented as $N_{c_i}$.

In the case where the BS ceases a transmission on one channel $c_j \in C$, if the absence of any other technology sharing the channel may be guaranteed on a long term basis (e.g., by level of regulation), the BS may resume $N_{c_i}$ reduction, when an idle slot is detected after waiting for a duration of $4 \cdot T_{sl}$ or reinitializing $N_{c_i}$ for each channel ci (where ci is different from cj ($c_i \neq c_j$)).

4.1.2. Type A2 Multi-Carrier Access Procedure

The counter N for each channel $c_j \in C$ may be determined according to the afore-described subclause 1.8.3., and is denoted by $N_{c_j}$. Here, $c_j$ may mean a channel having the largest CWp value. For each channel $c_j$, $N_{c_i} = N_{c_j}$.

When the BS ceases a transmission on any one channel for which determined, the BS reinitializes $N_{c_i}$ for all channels.

4.2. Type B Multi-Channel Access Procedure

The BS may select a channel $c_j \in C$ as follows.

The BS selects $c_j$ uniformly randomly from C before each transmission on multiple channels $c_i \in C$.

Or the BS does not select $c_j$ more than once every one second.

Herein, C is a set of channels that the BS intends to transmit, i=0, 1, . . . q−1, and q is the number of channels to be transmitted by the BS.

For a transmission on a channel $c_j$, the BS performs channel access on the channel $c_j$ according to the procedure described in subclause 1.8.3.1 along with the modification described in subclause 1.8.4.2.1. or subclause 1.8.4.2.2.

For each channel $c_i$, the BS senses the channel $c_i$ for at least a sensing interval $T_{mc}$=25 us immediately before the transmission on the channel $c_i$. The BS may perform a transmission on the channel $c_i$ immediately after sensing that the channel $c_i$ is idle during at least the sensing interval $T_{mc}$. When the channel is sensed as idle during all time periods during which idle sensing is performed on the channel $c_j$ within the given interval $T_{mc}$, the channel $c_i$ may be considered to be idle for $T_{mc}$.

The BS does not continuously perform transmissions on the channel $c_i \neq c_j$ ($c_i \in C$) for a period exceeding $T_{mcot,p}$ as given in Table 15. $T_{mcot,p}$ is determined using a channel access parameter used for the channel $c_j$.

In the procedure of this subclause, the channel frequency of the channel set C selected by the gNB is one subset of a predefined channel frequency set.

4.2.1. Type B1 Multi-Channel Access Procedure

A single CWp value is maintained for a channel set C.

To determine CWp for channel access on a channel $c_j$, step 2 in the procedure described in subclause 1.8.3.1 is modified as follows.

If at least 80% (Z=80%) of HARQ-ACK values corresponding to PDSCH transmission(s) in reference subframe k of all channels $c_i \in C$ are determined to be NACK, then CWp for all priority classes p∈{1,2,3,4} incremented to the next higher allowed value. Otherwise, the procedure goes to step 1.

4.2.2. Type B2 Multi-Channel Access Procedure

A CWp value is maintained independently for each channel $c_i \in C$. To determine Ninit for a channel $c_j$, the CWp value of the channel $c_{j1} \in C$ is used. Herein, $c_{j1}$ is a channel having the largest CWp among all channels of the set C.

5. Uplink Channel Access Procedures

The UE and the BS that schedules a UL transmission for the UE perform the following procedure for access to a channel (on which LAA SCell transmission(s) is performed). On the assumption that the UE and the BS are basically configured with a PCell that is a licensed band and one or more SCells which are unlicensed bands, UL CAP operations applicable to the present disclosure will be described below in detail, with the unlicensed bands represented as LAA SCells. The UL CAP operations may be applied in the same manner even when only an unlicensed band is configured for the UE and the BS.

The UE may access a channel on which UL transmission(s) is performed according to a Type 1 or Type 2 UL CAP.

Table 6 illustrates that mp, a minimum CW, a maximum CW, an MCOT, and an allowed CW size applied to a CAP vary according to a channel access priority class.

TABLE 6

| Channel Access Priority Class (p) | $m_p$ | $CW_{min,p}$ | $CW_{max,p}$ | $T_{ulm\,cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\,cot,p}$ = 10 ms if the higher layer parameter absenceOfAnyOtherTechnology-r14 or absenceOfAnyOtherTechnology-r16 is provided, otherwise, $T_{ulm\,cot,p}$ = 6 ms.

NOTE 2:
When $T_{ulm\,cot,p}$ = 6 ms it may be increased to 8 ms by inserting one or more gaps. The minimum duration of a gap shall be 100 us. The maximum duration before including any such gap shall be 6 ms.

5.1. Type 1 UL Channel Access Procedure

This subclause describes a CAP performed by a UE, in which a time duration spanned by sensing slots sensed to be idle before a UL transmission(s) is random. This subclause is applicable to the following transmissions:

PUSCH/SRS transmission(s) scheduled and/or configured by the BS

PUCCH transmission(s) scheduled and/or configured by the BS

Transmission(s) related to a random access procedure (RAP)

Figure 14:
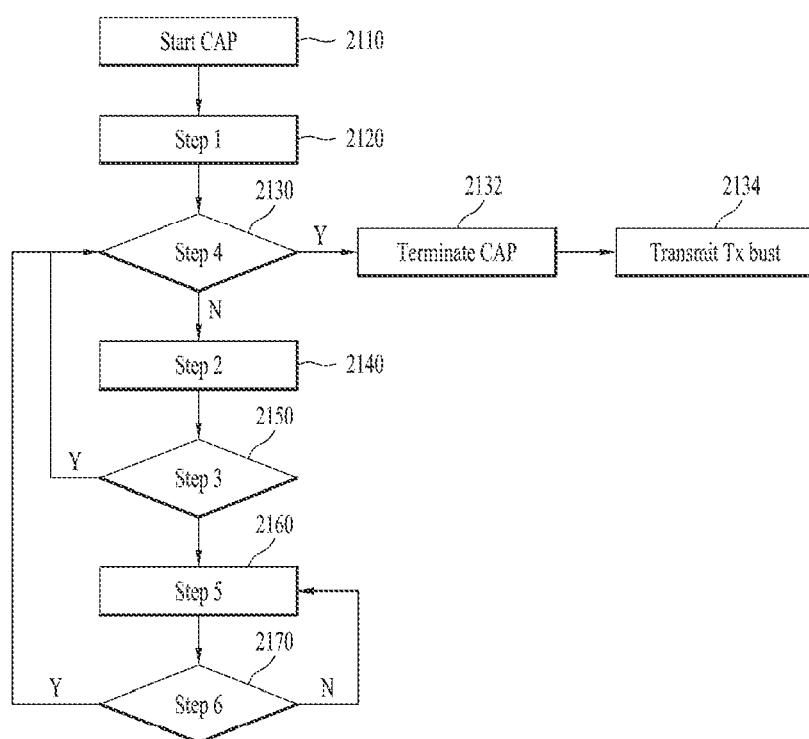

FIG. 14 is a diagram illustrating a UL CAP for transmission in an unlicensed band to which various embodiments of the present disclosure are applicable.

The Type 1 UL CAP of the UE for transmission in the unlicensed band to which various embodiments of the present disclosure are applicable may be summarized as follows.

For a UL transmission, a transmission node (e.g., a UE) may initiate a CAP to operate in an unlicensed band (2110).

The UE may select a backoff counter N randomly within a CW according to step 1. N is set to an initial value $N_{init}$ (2120). $N_{init}$ is a value randomly selected between 0 and $CW_p$.

Subsequently, when the backoff counter value N is 0 according to step 4 (2130; Y), the UE ends the CAP (2132). The UE may then transmit a Tx burst (2134). On the other hand, if the backoff counter value is not 0 (2130; N), the UE decrements the backoff counter value by 1 according to step 2 (2140).

Subsequently, the UE checks whether a channel is idle (2150). If the channel is idle (2150; Y), the UE checks whether the backoff counter value is 0 (2130).

On the contrary, if the channel is not idle, that is, the channel is busy (2150; N), the UE checks whether the channel is idle during a defer duration $T_d$ (of 25 usec or more) longer than a slot duration (e.g., 9 usec) according to step 5 (2160). If the channel is idle for the defer duration (2170; Y), the UE may resume the CAP.

For example, if the backoff counter value $N_{init}$ is 10 and the channel is determined to be idle after the backoff counter value is decremented to 5, the UE senses the channel during the defer duration and determines whether the channel is idle. If the channel is idle during the defer duration, the UE may perform the CAP again from the backoff counter value 5 (or the backoff counter value 4 after decrementing the backoff counter value by 1), instead of setting the backoff counter value $N_{init}$.

On the other hand, if the channel is busy during the defer duration (2170; N), the UE checks again whether the channel is idle during a new defer duration by performing operation 2160 again.

If the UE has not performed a UL transmission on the channel on which UL transmission(s) are performed after step 4 in the above procedure, the UE may perform the UL transmission on the channel, if the following conditions are satisfied.

If the UE is ready to perform the transmission and the channel is sensed to be idle during at least a sensing slot duration Tsl, and If the channel has been sensed to be idle during all the slot durations of a defer duration $T_d$ immediately before the transmission.

On the contrary, if the channel has not been sensed to be idle during the sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the slot durations of the defer duration $T_d$.

The defer duration $T_d$ includes a duration $T_f$ (=16 us) immediately followed by $m_p$ consecutive slot durations where each slot duration $T_{sl}$ is 9 us, and $T_f$ includes an idle slot duration $T_{sl}$ at the start of $T_f$.

5.2. Type 2 UL Channel Access Procedure 5.2.1 Type 2A UL Channel Access Procedure If the UE is indicated to perform the Type 2A UL CAP, the UE uses the Type 2A UL CAP for a UL transmission. The UE may perform the transmission immediately after sensing the channel to be idle during at least a sensing duration $T_{short\_ul}$=25 us. $T_{short\_ul}$ includes a duration $T_f$=16 us immediately followed by one slot sensing slot duration $T_{sl}$=9 us, and Tf includes a sensing slot at the start of $T_f$. The channel is considered to be idle for $T_{short\_ul}$, if two sensing slots within $T_{short\_ul}$ are sensed to be idle.

5.2.2. Type 2B UL Channel Access Procedure

If a UE is instructed to perform a type 2B UL channel access procedure, the UE uses a type 2B channel access procedure for UL transmission. The UE may perform a transmission immediately after a corresponding channel is sensed as idle during Tf=16 us. Tf includes a sensing slot occurring within last 9 us of Tf. When the channel is sensed to be in an idle state at least total 5 us or more along with sensing of at least 4 us occurring in the sensing slot, the channel is considered as idle during Tf.

5.2.3. Type 2C UL Channel Access Procedure

If a UE is instructed to perform a type 2C UL channel access procedure, the UE does not sense a channel to perform a transmission before performing the transmission. A duration corresponding to the transmission is maximum 584 us.

6. Channel Access Procedure for UL Multi-Channel Transmission(s)

If the UE
  is scheduled to transmit on a channel set C, a UL scheduling grant for the UL transmission on the channel set C indicates the Type 1 CAP, and UL transmissions are scheduled to start at the same time for all channels of the channel set C, and/or if the UE intends to perform the UL transmission in resources configured on the channel set C by the Type 1 CAP, and the channel frequencies of the channel set C is one subset of a preconfigured channel frequency set:

The UE may perform the transmission on a channel $c_i \in C$ by the Type 2 CAP.
    If the Type 2 CAP has been performed on the channel $c_i$ immediately before the UE transmission on a channel $c_j \in C$ (herein, i≠j), and
    If the UE has accessed the channel $c_j$ by using the Type 1 CAP,
      Before performing the Type 1 CAP on any channel in the channel set C, the UE uniformly randomly selects the channel $c_j$ from the channel set C.
  If the UE fails to access any channel, the UE may not perform the transmission on the channel $c_i \in C$ within the bandwidth of a carrier with a carrier bandwidth which has been scheduled or configured by UL resources.

Random Access (or RACH) Procedure

Figure 15:
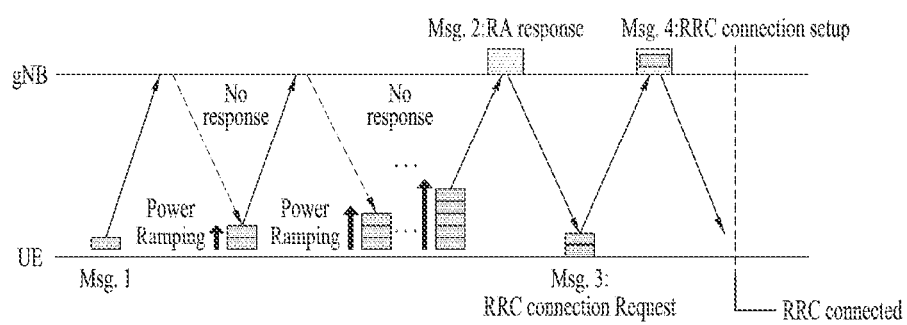
FIG. 15 are diagrams illustrating exemplary random access procedures (or random access channel (RACH) procedures)

FIG. 15 is a diagram illustrating an example of a random access channel (RACH) procedure. In particular, FIG. 15 illustrates an example of a contention-based random access channel (RACH) procedure.

First, the UE may transmit an RACH preamble as Msg 1 on a PRACH in an RACH procedure.

Random access preamble sequences of two different lengths are supported. The length 839 of the longer sequence is applied to the SCSs of 1.25 kHz and 5 kHz, whereas the length 139 of the shorter sequence is applied to the SCSs of 15 kHz, 30 kHz, 60 kHz, and 120 kHz.

Multiple preamble formats are defined by one or more RACH OFDM symbols and different CPs (and/or guard times). An RACH configuration for an initial bandwidth of a Pcell is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit an RACH preamble in RACH resources associated with the selected SSB. For example, upon retransmission of the RACH preamble, the UE may reselect any one of SSB(s), may retransmit the RACH preamble based on RACH resources associated with the reselected SSB. That is, the RACH resources for retransmission of the RACH preamble may be the same and/or different from RACH resources for transmission of the RACH preamble.

Upon receipt of the RACH preamble from the UE, the BS transmits an RAR message (Msg 2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive an RAR on a PDSCH scheduled by DCI carried on the PDCCH. The UE determines whether the RAR includes RAR information for its transmitted preamble, that is, Msg 1. The UE may make the determination by checking the presence or absence of the RACH preamble ID of its transmitted preamble in the RAR. In the absence of the response to Msg 1, the UE may retransmit the RACH preamble a predetermined number of or fewer times, while performing power ramping. The UE calculates PRACH transmission power for a preamble retransmission based on the latest path loss and a power ramping counter.

The RAR information may include the preamble sequence transmitted by the UE, a cell RNTI (C-RNTI) that the BS has allocated to the UE attempting random access, UL transmit time alignment information, UL transmission power adjustment information, and UL radio resource allocation information. Upon receipt of its RAR information on the PDSCH, the UE may acquire time advance information for UL synchronization, an initial UL grant, and a temporary C-RNTI. The timing advance information is used to control a UL signal transmission timing. To align a PUSCH and/or PUCCH transmission of the UE with a subframe timing of a network end, the network (e.g., the BS) may measure the time difference between PUSCH, PUCCH, or SRS reception and a subframe and transmit the timing advance information based on the time difference. The UE may transmit a UL signal as Msg 3 of the RACH procedure on a UL-SCH based on the RAR information. Msg 3 may include an RRC connection request and a UE ID. The network may transmit Msg 4 in response to Msg 3. Msg 4 may be handled as a contention resolution message on DL. As the UE receives Msg 4, the UE may enter the RRC_CONNECTED state.

Meanwhile, the contention-free random access channel (RACH) procedure may be performed when the UE is handed over to another cell or BS, or may be performed when requested by a command of the BS. The basic procedure of the contention-free random access channel (RACH) procedure is similar to the contention-based random access channel (RACH) procedure. However, unlike the contention-based random access channel (RACH) procedure in which a UE randomly selects a preamble to be used among a plurality of random access preambles, a preamble (hereinafter referred to as a dedicated random access preamble) to be used by the UE is allocated to the UE by the BS in the contention-free random access channel (RACH) procedure. Information for the dedicated random access preamble may be included in an RRC message (e.g., a handover command) or may be provided to the UE via a PDCCH order. When the random access channel (RACH) procedure is initiated, the UE sends the dedicated random access preamble to the BS. If the UE receives information about the random access channel (RACH) procedure from the BS, the random access channel (RACH) procedure is completed.

As described before, the UL grant included in the RAR schedules a PUSCH transmission for the UE. A PUSCH carrying an initial UL transmission based on the UL grant of the RAR is referred to as an Msg 3 PUSCH. The contents of the RAR UL grant start from the MSB and ends in the LSB, given as Table 7.

TABLE 7

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The transmit power control (TPC) command is used to determine the transmission power of the Msg 3 PUSCH. For example, the TPC command is interpreted according to Table 8.

TABLE 8

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In the contention-free RACH procedure, a CSI request field in an RAR UL grant indicates whether the UE is to include an aperiodic CSI report in a corresponding PUSCH transmission. An SCS for Msg 3 PUSCH transmission is provided by an RRC parameter. The UE may transmit the PRACH and the Msg 3 PUSCH on the same UL carrier of the same serving cell. A UL BWP for the Msg 3 PUSCH transmission is indicated by SIB1 (SystemInformationBlock1).

Before a detailed description, implementation examples of operations of a UE and a BS according to an embodiment of the present disclosure will be described below with reference to FIGS. 16 and 17.

Figure 16:
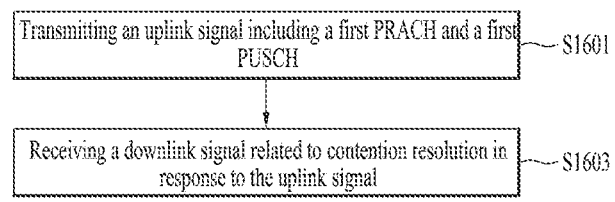
FIG. 16 and FIG. 17 are diagrams to describe an implementation example of operations of a user equipment and a base station according to an embodiment of the present disclosure.

FIG. 16 is a diagram to describe an implementation example of operations of a user equipment according to an embodiment of the present disclosure. Referring to FIG. 16, a UE may transmit an Uplink (UL) signal including a first Physical Random Access Channel (PRACH) and a first Physical Uplink Shared Channel (PUSCH) [S1601]. Thereafter, the UE may receive a Downlink (DL) signal related to contention resolution in response to the UL signal [S1603]. In this case, a specific method of transmitting and receiving a signal for performing a random access procedure by the UE in S1601 to S1603 may be based on embodiments and features described below.

The UE illustrated in FIG. 16 may be one of various wireless devices illustrated in FIGS. 22 to 25. For example, the UE of FIG. 16 may be a first wireless device 100 illustrated in FIG. 22 or a wireless device 100 or 200 illustrated in FIG. 23. In other words, the operation of FIG. 16 may be performed by one of the various wireless devices illustrated in FIGS. 22 to 25.

Figure 17:
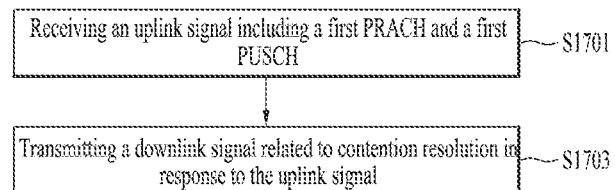

FIG. 17 is a diagram to describe an implementation example of operations of a base station according to an embodiment of the present disclosure. Referring to FIG. 17, a BS may receive a UL signal including a first Physical Random Access Channel (PRACH) and a first Physical Uplink Shared Channel (PUSCH) [S1701]. Thereafter, the BS may transmit a DL signal related to contention resolution in response to the UL signal [S1703]. In this case, a specific method of transmitting and receiving a signal for performing a random access procedure by the BS in S1701 to S1703 may be based on embodiments and features described below.

In some implementations, the BS of FIG. 17 may include one of various wireless devices shown in FIGS. 22 to 25. For example, the BS of FIG. 17 may include a second wireless device 200 of FIG. 22 or a wireless device 100/200 of FIG. 23. So to speak, the operation process of FIG. 17 may be performed and executed by one of the various wireless devices disclosed in FIGS. 22 to 25.

Hereinafter, in the steps S1601 and S1701 of transmitting and receiving the UL signal including the first PRACH and the first PUSCH, a specific embodiment in which the UE determines a Tx power for the UL signal based on a TX beam direction will be described.

In the LTE and/or NR system, a UE may perform a UL transmission by an RACH procedure without being scheduled for the UL transmission directly by a given BS or cell. From the perspective of the UE, the RACH procedure in the LTE and/or NR system is a 4-step procedure including 1) random access preamble transmission, 2) reception of Msg 2 corresponding to an RAR, 3) transmission of Msg 3 including a PUSCH, and 4) reception of Msg 4 including contention resolution information.

Msg 2 is a message by which the BS allocates UL resources to be used for transmission of Msg 3 from the UE which has transmitted a preamble, upon receipt of the preamble. The UE may transmit its identification information such as an IMSI or a TMSI and information about a connection request by Msg 3. Upon receipt of Msg 3, the BS transmits the identification information of the UE and information required for random access in Msg 4, thereby preventing collision between different UEs during the RACH procedure and completing the RACH procedure for the UE.

Compared to legacy LTE and NR Rel-15 in which the RACH procedure is performed in four steps as described above, the 2-step RACH procedure is under study to reduce the processing delay of the 4-step RACH procedure and use the RACH procedure even in a small cell or an unlicensed bandwidth in the newly introduced NR Rel-6. The 2-step RACH procedure does not include the step of transmitting Msg 3 and the step of transmitting Msg 4 including a contention resolution message. Instead, the UE transmits both a message corresponding to Msg 3 and a preamble as Msg A to the BS in the first step of the RACH procedure, and the BS transmits both a message corresponding to Msg 4 and an RAR as Msg B in response to Msg A to the UE. Upon receipt of Msg B, the UE completes the RACH procedure by decoding Msg B and then performs data transmission and reception.

Figure 18:
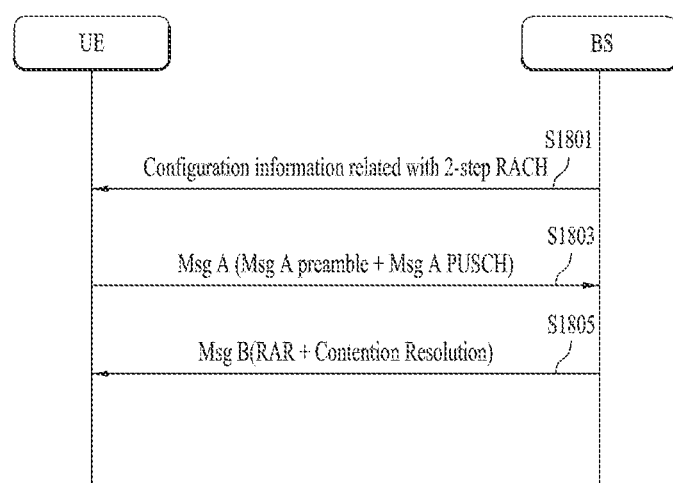
FIG. 18 is a diagram illustrating a basic process of a 2-step RACH.

FIG. 18 is a diagram illustrating a basic process of a 2-step RACH. Referring to FIG. 18, a UE may receive 2-step RACH related configuration information included in system information broadcasted from a BS [S1801]. Having received the 2-step RACH related configuration information, the UE transmits a Msg A including an RACH preamble (or a PRACH preamble) and a PUSCH based on the corresponding configuration information to perform a random access procedure on the BS [S1803]. In doing so, the RACH preamble and the PUSCH may be transmitted in a time domain consecutively or in a manner of leaving a predetermined gap in between, and Identifier (ID) information of the UE is included in the corresponding PUSCH. The BS detects the preamble, thereby predicting and receiving the PUSCH having the gap or the consecutive PUSCH. The BS receives an access request and/or response from a higher layer based on the UE's ID transmitted on the PUSCH, and then transmits a Msg B including such information as RAR, contention resolution and the like to the UE in response to the Msg A [S1805]. Thereafter, depending on whether the Msg B is received by the UE, the UE completes the access to the BS in a manner identical or similar to operations after an operation of receiving a Msg 4 in the existing 4-step RACH procedure and then transceives data with the BS.

In the present disclosure below, various embodiments applicable in the 2-step RACH procedure will be reviewed, and in particular, 1) a method of configuring a Msg-A Tx power according to performing Listen Before Talk (LBT) on an unlicensed band and 2) a method of configuring a PUCCH resource for UE's HARQ-ACK transmission in response to a Msg B will be examined in detail.

2-Step RACH Procedure According to LBT on Unlicensed Band

In NR, as a UE may perform a random access procedure on an unlicensed band, a Listen Before Talk (LBT) process required for signal transmission/reception on the unlicensed band may also be applied to signal transmission/reception for the random access procedure. That is, in the NR-Unlicensed (NR-U) spectrum system, a BS and a UE always perform LBT to check an idle or busy state of a Tx/Rx channel before transceiving a signal, which may be performed in the same manner in a procedure for transmitting/receiving Msg A and Msg B for a 2-step RACH procedure on an unlicensed band.

Since the transmission of Msg A in the 2-step RACH procedure includes the transmission of Msg A PUSCH together with the transmission of Msg A RACH preamble, a random access procedure performed subsequently may vary depending on the success or failure of LBT for the Msg A PRACH preamble and the Msg A PUSCH. For example, if the UE successfully performs LBT prior to the transmission of the Msg A PRACH preamble and the Msg A PUSCH and transmits up to the Msg A PUSCH without any problems, the BS may receive both of the Msg A PRACH preamble and the Msg A PUSCH correctly, transmit a Msg B including contention resolution information to the UE, and complete the 2-step RACH procedure. On the contrary, if the UE fails in LBT for the Msg A PRACH preamble or the Msg A PUSCH, the UE 1 may not successfully transmit a Msg A. The BS failing to receive the Msg A may give an instruction of retransmission of the Msg A or fall-back to the 4-step RACH procedure.

In this case, considering that the Msg A conceptually includes both of the Msg A PRACH preamble and the Msg A PUSCH, whether to retransmit the Msg A according to the LBT failure may be handled differently depending on a time gap between a Msg A PRACH preamble Tx time and a Msg A PUSCH Tx time. Namely, a retransmission procedure of the Msg A may vary depending on whether it is a situation that the UE consecutively transmit a Msg A PUSCH after transmitting a Msg A PRACH preamble or a situation that a time gap greater than a minimum time for requiring LBT exists until the UE transmits the Msg A PUSCH after transmitting the Msg A PRACH preamble.

(1) Case that Msg A PRACH Preamble and Msg A PUSCH are Transmitted Consecutively In case that a Msg A PRACH preamble and a Msg A PUSCH are transmitted consecutively, it may refer to a case that the Msg A PRACH preamble and the Msg A PUSCH are consecutively transmitted in a single slot or a case that the Msg A PRACH preamble and the Msg A PUSCH linked thereto are transmitted in consecutive slots.

Namely, the case that the Msg A PRACH preamble and the Msg A PUSCH are consecutively transmitted includes a case that a time gap amounting to a minimum time for requiring LBT does not exist between the transmission of the Msg A PRACH preamble and the transmission of the Msg A PUSCH, and a situation as shown in FIG. 10 may be an example thereof.

Figure 19:
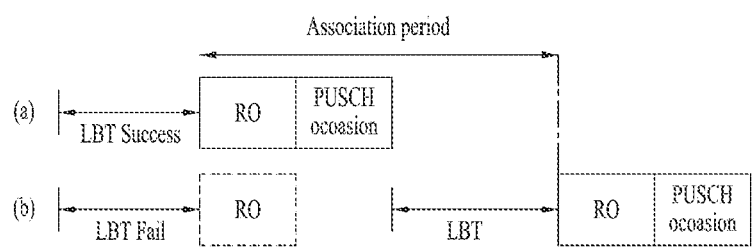
FIG. 19 is a diagram illustrating an embodiment of Msg A transmission according to LBT success or failure of a user equipment and a transmission beam direction configuration.

FIG. 19 is a diagram illustrating an embodiment of Msg A transmission according to LBT success or failure of a UE and a transmission beam direction configuration. FIG. 19 (a) shows that a UE consecutively transmits a Msg A PRACH preamble and a Msg A PUSCH as succeeding in LBT at a specific timing. FIG. 19 (b) shows that a UE consecutively transmits a Msg A PRACH preamble and a Msg A PUSCH as succeeding in LBT at a next timing after having failed in LBT at a specific timing. Since a time gap amounting to an LBT-required condition time does not exist between a Tx timing of the Msg A PRACH preamble and a Tx timing of the Msg A PUSCH in both FIG. 19 (a) and FIG. 19 (b), the UE performs LBT only before the Msg A PRACH preamble transmission and performs consecutive transmission intactly without performing LBT in transmitting the Msg A PUSCH. Therefore, for such a case, depending on success or failure of LBT performed before a Msg A PRACH preamble transmission, a signal transmission operation of a UE and a BS and a power control for signal transmission thereof may be configured differently.

If a UE fails in LBT for Msg A PRACH preamble transmission at a predetermined timing, the UE may perform LBT for Msg A PRACH preamble transmission again for a next RACH Occasion (RO) after an association period from an LBT failure timing. Alternatively, if the UE fails in LBT for Msg A PRACH preamble transmission at a predetermined timing, the UE newly starts a random access resource selection procedure, performs SSB selection based on SSB (Synchronization Signal and Physical Broadcast Channel (SS/PBCH)) or a Reference Signal Received Power (RSRP) of Channel State Information-Reference Signal (CSI-RS), and selects an RO and a Random Access Preamble Index (RAPID) associated with the SSB, thereby transmitting a Msg A PRACH preamble on the corresponding RO, and the UE may consecutively transmit a Msg A PUSCH as well. In addition, since the consecutively transmitted Msg A PUSCH has a transport channel state different from that of a previous Tx environment, contents and modulation order included in the Msg A PUSCH may be configured different from the previous Msg A PUSCH transmission to meet a channel environment in which the Msg A PUSCH is transmitted. For example, when a state of a channel at a Msg A PUSCH Tx timing is good, the UE may transmit a Msg A PUSCH in which a larger amount of information is included and may apply a high modulation order thereto.

Here, in case of a Msg A, since Msg A PUSCH is transmitted before feedback of a BS after Msg A PRACH preamble transmission, Tx factors such as a maximum Tx count for Msg A retransmission, a ramping step size, a power ramping counter and the like need to be configured separately. Specifically, for the configuration of the power ramping counter and the maximum Tx count of the Msg A among the factors, the specific methods described later may be considered.

First, in case of a power ramping counter, since a Msg A PRACH preamble and a Msg A PUSCH are consecutively transmitted, it may be appropriate to use a common power ramping counter for the Msg A PRACH preamble and the Msg A PUSCH. If a UE fails to transmit the Msg A PRACH preamble on a determined RO according to LBT, the UE may perform the LBT again on a next RO as shown in FIG. 10 (b) and then transmit the Msg A PRACH preamble after succeeding in the LBT. In this case, for re-performance of the LBT and the transmission of the Msg A PRACH preamble upon the successful LBT, the UE may configure a power ramping counter with a maintained or increased value by comparing with a power ramping counter supposed to be configured to transmit the Msg A PRACH preamble in case of previous LBT failure. Here, the power ramping counter mentioned in the present disclosure may refer to a power ramping counter used for general retransmission.

1) Method of Configuring a Tx Power by Maintaining a Ramping Counter with the Same Value as the Previous A UE may first maintain a value of a power ramping counter as it is. That is, if the UE succeeds in LBT by performing the LBT for a next RO due to LBT failure for a previous RO and then transmits a Msg A, since the Msg A was not transmitted on the previous RO substantially from the perspective of the UE, randomly increasing a Tx power of the UE may cause inefficient power waste. As a result, the UE may transmit the Msg A by maintaining a Tx power originally intended in a manner of maintaining the value of the power ramping counter as it is.

2) Method of Configuring a Tx Power by Configuring a Ramping Counter with a Value Increased Higher than the Previous A UE may determine a Tx power by increasing a value of a power ramping counter. Although the UE succeeds in LBT by performing the LBT for a next RO due to LBT failure for a previous RO and then transmits a Msg A, the UE may determine the Tx power by configuring the power ramping counter in a manner of increasing a previous value by +1. If a Msg A Tx power is determined by applying the power ramping counter increased by +1, considering that other UEs having attempted the same RACH at a timing of the previous RO may attempt RACH at a timing of a next RO with a Tx power increased by ramping a power, it is able to prevent a problem of having difficulty in detecting a Msg A PRACH preamble of the UE due to a relatively small Tx power. In addition, the purpose of the introduction of a 2-step RACH procedure is to further reduce the latency occurring in the 4-step RACH procedure if possible, so latency can be reduced a little by raising detection probability in a manner that the UE consumes an additional power for each retransmission, unlike the 4-step RACH procedure, for a fast network access as latency falls behind due to LBT in NR-U. For such reasons, when a UE transmits a Msg A on a next RO due to LBT failure for a previous RO, the UE may regard the LBT failure for the previous RO as Msg A transmission failure, increase a power ramping counter by +1, and then apply it to transmission of a Msg A PRACH preamble and a Msg A PUSCH.

3) Method of Configuring a Tx Power by Maintaining or Increasing a Power Ramping Counter According to a Tx Beam Direction Considering the advantages and disadvantages of the foregoing methods 1) and 2), a UE may use a method of maintaining or increasing a power ramping counter according to a Tx beam direction. That is, unlike the method 1) of maintaining a power irrespective of a beam direction and the method 2) of increasing a power irrespective of a beam direction, according to the corresponding method, a UE determines LBT failure for a previous RO as retransmission but a power ramping counter is increased or maintained depending on a Tx beam of the UE.

Figure 20A:
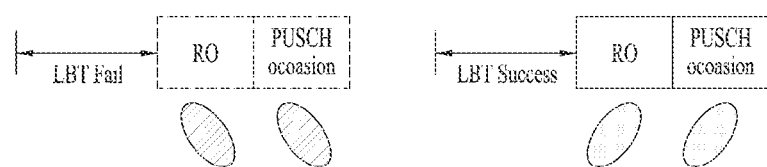
FIGS. 20A and 20B are diagrams illustrating maintaining or increasing a power ramping counter depending on a transmission direction of a user equipment according to an embodiment of the present disclosure.
Figure 20B:
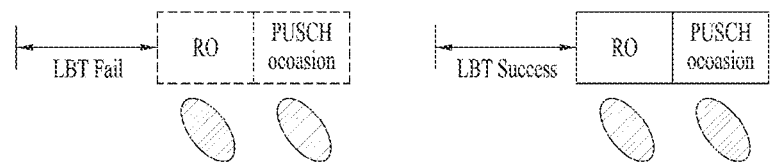

FIGS. 20A and 20B are diagrams illustrating maintaining or increasing a power ramping counter depending on a Tx direction of a UE according to an embodiment of the present disclosure. As shown in FIG. 20A, when a Tx spatial beam configured upon LBT failure for a previous RO is different from a Tx spatial beam configured upon LBT success for a next RO, a UE may transmit a Msg A by maintain a power ramping counter of the same value as the previous. On the contrary, as shown in FIG. 20B, when a Tx spatial beam configured upon LBT failure for a previous RO is the same as a Tx spatial beam configured upon LBT success for a next RO, a UE may transmit a Msg A by increasing a power ramping counter higher than the previous.

In summary, when a UE is not instructed that LBT for transmission or retransmission of a Msg A has failed in transmitting or retransmitting the Msg A, the UE configures a Tx power by maintaining or increasing a power ramping counter depending on whether a Tx spatial beam direction is equal to that of the transmission or retransmission of a previous Msg A. In this case, since the Tx spatial beam direction for the transmission or retransmission of the Msg A may be associated with an SSB selected by the UE for the transmission or retransmission of the Msg A, the UE may be interpreted as configuring a Tx power by maintaining or increasing a power ramping counter depending on whether the SSB selected by the UE for the transmission or retransmission of the Msg A is the same as an SSB selected for transmission or retransmission of a previous Msg A. In addition, considering that a Msg A PRACH and a Msg A PUSCH are consecutively transmitted, the Tx spatial beam direction for the transmission or retransmission of the previous Msg A may be conceptually understood as including a Tx spatial beam direction configured for transmission or retransmission of a previous PRACH.

For example, when a UE transmits or retransmits a Msg A, if not receiving an indication of LBT failure for the transmission or retransmission of the corresponding Msg A from a lower layer, the UE compares an SSB selected by itself with an SSB selected for transmission or retransmission of a previous PRACH. If the SSB selected by itself is not changed, the UE may transmit the Msg A by configuring a Tx power in a manner of increasing a power ramping counter higher by 1 than the previous. Alternatively, when a UE transmits or retransmits a Msg A, if not receiving an indication of LBT failure for the transmission or retransmission of the corresponding Msg A from a lower layer, the UE compares an SSB selected by itself with an SSB selected for transmission or retransmission of a previous PRACH. If the SSB selected by itself is changed, the UE may transmit the Msg A by configuring a Tx power in a manner of maintaining a power ramping counter with the same value as the previous.

When a UE transmits or retransmits a Msg A, if receiving an indication of LBT failure for the transmission or retransmission of the corresponding Msg A, the UE performs retransmission by determining such LBT failure as retransmission. In doing so, if an indication for LBT failure recovery is configured in the UE, the UE may perform a random access resource selection procedure for a 2-step RACH procedure.

4) Method of Configuring a Tx Power by Maintaining or Increasing a Power Ramping Counter Depending on the Relation Between an RO of a 2-Step RACH Procedure and an RO of a 4-Step RACH Procedure A UE may maintain or increase a power ramping counter depending on the relation between an RO of a 2-step RACH procedure and an RO of a 4-step RACH procedure. Namely, depending on whether an RO of a 2-step RACH procedure and an RO of a 4-step RACH procedure are shared with each other or configured by being separated from each other.

The RO of a the-step RACH procedure and the RO of the 4-step RACH procedure may be basically shared. Here, if the ROs are shared, it means that a Msg 1 preamble in the 4-step RACH procedure and a Msg A PRACH preamble in the 2-step RACH procedure are transmitted on the same RO. In addition, if the ROs are configured by being separated from each other, it means that a time/frequency resource for the Msg 1 preamble in the 4-step RACH procedure and a time/frequency resource for the Msg A PRACH preamble in the 2-step RACH procedure exist independently from each other.

The methods 1) to 3) described above deal with operations in a UE and BS irrespective of whether ROs are shared or configured by being separated from each other, and thus the corresponding method applies a different power ramping counter determining method with respect to whether ROs are shared or configured by being separated from each other. Namely, when an RO for a 2-step RACH procedure and an RO for a 4-step RACH procedure are configured by being separated from each other, a UE performing the 2-step RACH procedure increases a value of a power ramping counter for retransmission by recognizing the LBT failure on RO as Transmission/Reception (Tx/Rx) failure like the methods 2) and 3) described above. On the other hand, when an RO for a 2-step RACH procedure and an RO for a 4-step RACH procedure are shared with each other, the UE maintains a value of the power ramping counter like the foregoing method 1) in the same manner of the existing 4-step RACH procedure of NR-U without separation between the 2-step RACH procedure and the 4-step RACH procedure.

Meanwhile, a maximum Tx count of a Msg A in a 2-step RACH procedure may be give separately from a 4-step RACH procedure, and may follow a maximum Tx count configured for a Msg 1 of the 4-step RACH procedure if there is no value given separately. If a value of a power ramping counter is configured greater by 1 than a maximum Tx count of a Msg A, a UE may progress a reestablishment procedure according to Radio Link Failure (RLF). In addition, when an RO for a 2-step RACH procedure and an RO for a 4-step RACH procedure are shared mutually, if a maximum Tx count of a Msg 1 for the 4-step RACH procedure is configured greater than that of a Msg A in the 2-step RACH procedure, the UE may transmit the Msg 1 only from the time when the power ramping counter becomes greater by 1 than the maximum Tx count of the Msg A. In addition, a value of a ramping step size may determine a Tx power for retransmission by applying a ramping step size for the Msg 1 from the time when the power ramping counter becomes greater by 1 than the maximum Tx count of the Msg A. In this case, fallback and RLF operations of the UE with respect to a value and of each counter and a maximum value may be applicable not only to NR-U but also to NR.

(2) Case that a Time Gap Exists Between Transmission of a Msg A PRACH Preamble and Transmission of a Msg A PUSCH The corresponding case means that a time gap greater than an LBT-required minimum time exists until a UE transmits a Msg A PUSCH after having transmitted a Msg A PRACH preamble. Since transmission of the Msg A PRACH preamble and transmission of the Msg A PUSCH are performed discontinuously with a predetermined gap, the UE performs LBT on both of the Msg A PRACH preamble transmission and the Msg A PUSCH transmission. Therefore, operations of the UE and BS may vary differently depending on whether to succeed or fail in LBT for a Tx timing of each signal. In addition, since there is spacing between Tx timings of the respective signals, a beam direction determined according to a channel state may vary as well and thus a power configuration for retransmission may be complicated as well. Hereinafter, operations and Tx power configurations of a UE and BS according to a failure timing of LBT for transmission of a Msg A PRACH preamble and a Msg A PUSCH will be described.

Regarding configurations of a power ramping counter in the above case, since a Msg A PRACH preamble and a Msg A PUSCH are transmitted with a predetermined gap, it is able to consider both a signal counter sharing a power ramping counter to use in relation to retransmission power configurations of the Msg A PRACH preamble and the Msg A PUSCH and a dual counter configuring to use a power ramping counter for each retransmission power configuration of the Msg A PRACH preamble and the Msg A PUSCH. In addition, a maximum Tx count of a Msg A is not applied in common to the Msg A PRACH preamble and the Msg A PUSCH, but a maximum Tx count for each of the Msg A PRACH preamble and the Msg A PUSCH may be configured.

In this case, when a single power ramping counter is used, a condition in which a value of the counter is increased or maintained may be a presence or non-presence of a change in a direction of a Tx spatial beam for Msg A PRACH preamble transmission in Msg A retransmission. That is, if the Tx spatial beam direction for the Msg A PRACH preamble transmission is the same as the previous transmission, the counter value increases. If the Tx spatial beam direction for the Msg A PRACH preamble transmission is different from the previous transmission, the counter value is maintained. In addition, when a dual power ramping counter is used, the condition under which the value of each counter is increased or maintained may be a presence or absence of a change in a Tx spatial beam direction for each of the Msg A PRACH preamble and the Msg APUSCH, compared to the previous transmission. That is, for the Msg A PRACH preamble and the Msg A PUSCH, the value of each counter increases if the Tx spatial beam direction for transmission of each signal is the same as the previous transmission, or the value of each counter is maintained if the Tx spatial beam direction for transmission of each signal is different from the previous transmission.

For reference, the term 'reattempt' mentioned in the present disclosure below means that a Msg A PRACH preamble is not transmitted on an original RO due to LBT failure but is transmitted on a next RO, or that a Msg A PUSCH is not transmitted on an original PO due to LBT failure but is transmitted on a next PO. A case of transmitting a different Msg A PRACH preamble on an originally scheduled RO despite being unable to transmit a Msg A PRACH preamble intended to transmit originally due to LBT failure does not mean the 'reattempt' mentioned in the present disclosure, and in this case, the counter value does not increase as well. Operations of a UE and BS according to the increase and maintenance of a power ramping counter for retransmission of each signal included in a Msg A, a retransmission maximum count, and LBT failure will be described below in a manner of being separated into a case of LBT failure before Msg A PRACH preamble transmission and a case of LBT failure before Msg A PUSCH transmission.

1) LBT Failure Before Msg a PRACH Preamble Transmission

When a UE uses a single power ramping counter for a Msg A PRACH preamble and a Msg A PUSCH, if failing in LBT before Msg A PRACH preamble transmission, the UE may increase or maintain a corresponding common power ramping counter value according to the aforementioned embodiments for a case that the Msg A PRACH preamble and the Msg A PUSCH are transmitted consecutively. In addition, when a UE uses a dual power ramping counter for a Msg A PRACH preamble and a Msg A PUSCH, if failing in LBT before Msg A PRACH preamble transmission, a value of the counter for each of the Msg A PRACH preamble and the Msg A PUCSH may be independently increased or maintained. Particularly, if a Tx spatial beam direction configured for transmission of each signal is the same as the previous transmission, a value of each counter is increased. If a Tx spatial beam direction configured for transmission of each signal is different from the previous transmission, a value of each counter is maintained.

In this case, if a UE having failed in LBT before Msg A PRACH preamble transmission reattempts transmission of a Msg A, the UE may continuously transmit the Msg A or fall back to the 4-step of transmitting a Msg 1 only. According to each method, operations of the UE and BS may be changed.

(a) First, if a UE is unable to transmit a Msg A PRACH preamble due to failure in LBT for a specific RO, the UE may attempt transmission of the Msg A PRACH preamble again on a next RO. In doing so, the UE may attempt the transmission of the Msg A PRACH preamble by selecting an SSB differently according to a channel measured for the Msg A PRACH preamble transmission and randomly selecting an RAPID from a preamble set for the 2-step associated with the selected SSB. When a single power ramping counter is configured, if a Msg A PRACH preamble is retransmitted according to the same Tx beam direction as a Tx beam direction used for the previous Msg A PRACH preamble transmission, a value of the corresponding counter is increased. Or, if a Msg A PRACH preamble is retransmitted according to a beam direction different from a Tx beam direction used for the previous Msg A PRACH preamble transmission, a value of the corresponding counter is maintained equal to the previous value. When a dual power ramping counter is configured, a value of a counter for each of a Msg A PRACH preamble and a Msg A PUSCH may be independently increased or maintained. Particularly, if a Tx spatial beam direction that will be configured for transmission of each signal is the same as a Tx spatial beam direction configured for the previous transmission, a value of each counter is increased. If a Tx spatial beam direction that will be configured for transmission of each signal is different from a Tx spatial beam direction configured for the previous transmission, a value of each counter is maintained.

(b) If a UE is unable to transmit a Msg A PRACH preamble due to failure in LBT for a specific RO, the UE may transmit not a Msg A PRACH preamble but a Msg 1 only on a next RO. Namely, the UE may fall back to a 4-step RACH procedure. In case of a channel occupied by another UE or occupied for transmission of a different signal, since it is highly probable that a channel for performing a contiguous next LBT is occupied as well, the corresponding method is a method for using resource efficiently by transmitting a Msg 1 only without reserving a time/frequency resource for allocating a PUSCH resource for a Msg A. In this case, although a UE transmits a Msg 1 using a preamble index for a 2-step RACH procedure, a BS waits until a maximum Tx available time of a Msg A PUSCH with reference to a detection time of a Msg A, and if the corresponding time expires, the BS transmits a Msg 2 in response to the Msg 1 and performs a 4-step RACH procedure. Here, a Tx power of the Msg 1 may be configured based on configuration for the Msg 1 used in the 4-step RACH procedure like a target received power for the Msg 1.

2) LBT Failure Before Msg A PUSCH Transmission

When a UE fails in LBT before Msg A PUSCH transmission, an operation of the UE may be changed according to whether a PO is configured to include a time gap for LBT or whether a PO is configured to exclude a time gap for LBT.

In this case, if the PO is configured to include the time gap for LBT, the UE performs LBT within a time gap for the corresponding LBT. If succeeding in the LBT, the UE may transmit a Msg A PUSCH simultaneously with the success. Alternatively, the UE performs the LBT within the time gap for the corresponding LBT. If succeeding in the LBT, the UE may transmit a random signal before a starting symbol of Msg A PUSCH, which is preconfigured for exclusive occupation of a channel till a timing for intending to transmit a Msg A PUSCH originally, and then transmit a Msg A PUSCH from the starting symbol of Msg A PUSCH.

On the other hand, when a PO is configured to exclude a time gap for LBT, if a UE performs the LBT before the corresponding PO and fails to succeed in the LBT until a starting symbol of the corresponding PO, the UE, like the embodiments described below, may perform LBT for transmitting a Msg A PUSCH only on a next PO and attempt transmission of a Msg A PUSCH, may perform LBT again to transmit a Msg A PRACH preamble on a next RO and reattempt transmission of a Msg A, or may fall back to a 4-step RACH procedure by transmitting a Msg 1 only.

(a) First, a UE may transmit a Msg A PUSCH only considering that a Msg A PRACH preamble was already transmitted. In this case, a Tx timing of the Msg A PUSCH is performed on a resource of a next PO when a Msg A PRACH preamble and a PO are in multiple-to-one mapping relation or one-to-one mapping relation. In this case, since the UE does not retransmit the Msg A PRACH, a resource for Msg A PUSCH transmission uses the same Msg A PUSCH resource associated with RAPID used for the previous transmission. However, in order to distinguish whether the transmission of the Msg A PUSCH is retransmission due to LBT failure at a previous timing or a Msg A PUSCH transmission attempt at a current timing, the Msg A PUSCH should be capable of including information on retransmission, and a BS should be also able to deliver whether it is a response to the nth previous RAPID via a Msg B based on the corresponding information. In addition, the UE recognizes the Msg A PUSCH transmission attempt according to the LBT failure as retransmission, so that the UE may increase or maintain a value of a power ramping counter for Tx power configuration of Msg A PUSCH according to the above-described embodiments for the case of consecutively transmitting a Msg A PRACH preamble and a Msg A PUSCH.

On the other hand, when a Msg A PRACH preamble and a PO are in one-to-one mapping relation, a UE transmits a Msg A PUSCH only by performing LBT prior to or within a plurality of POs. If channel estimation is possible among a plurality of POs, a value of a power ramping counter for a Msg A PUSCH Tx power is increased if a Tx spatial beam direction for the Msg A PUSCH is the same as the previous transmission, or maintained if a Tx spatial beam direction for the Msg A PUSCH is different from the previous transmission. In this case, if a dual power ramping counter is configured for each of Msg A PRACH and Msg A PUSCH, the corresponding counter may indicate only a retransmission counter for the Msg A PUSCH.

(b) A UE may newly select a Msg A PRACH preamble for LBT failure before Msg A PUSCH transmission and may transmit a Msg A PUSCH on a PO associated with it. In case of the foregoing method of transmitting a Msg A PUSCH only, an additional mechanism is necessary as follows. Information on Msg A PRACH preamble transmission should be delivered through contents of a Msg A PUSCH. Through this, a BS obtains a presence or non-presence of current LBT failure of the UE, makes a response by distinguishing a current Tx timing and a past Tx timing of the UE, and delivers relevant information. On the other hand, according to the present method, if a UE fails to transmit a Msg A PUSCH, a UE may select and transmit a Msg A PRACH preamble on a next RO, and a BS may expect reception of a Msg A PUSCH by estimating a Timing Advance (TA) value based on the corresponding Msg A PRACH preamble. In this case, a Tx power for the Msg A PRACH preamble may be allocated based on increasing or maintaining, by the UE, a value of a power ramping counter for Tx power configuration of the Msg A PUSCH according to the aforementioned embodiments described for the case of consecutively transmitting a Msg A PRACH preamble and a Msg A PUSCH. If a dual power ramping counter is used, whether to increase or maintain a power ramping counter for each signal may be configured differently depending on whether a Tx spatial beam direction for each of a Msg A PRACH preamble and a Msg A PUSCH is changed.

(c) Since a Msg A PRACH preamble has been transmitted already, a UE may expect to receive a response to the Msg A PRACH preamble without transmitting a Msg A PUSCH by determining that a BS has received the preamble only. Although the UE transmits a Msg 1 using a preamble index for a 2-step RACH procedure, the BS waits until a maximum transmittable time of the Msg A PUSCH with reference to a detection time of a Msg A. If the corresponding time expires, the BS determines transmission failure due to LBT and then delivers information required for transmission of a Msg 3 to the UE via a Msg B. Since the UE has transmitted the Msg A PRACH preamble only, the UE automatically estimates a fallback to a 4-step RACH procedure and expects the information required for the Msg 3 transmission to be received via the Msg B. Thereafter, the UE receives the Msg B and may transmit the Msg 3 using the information included in the Msg B.

Configuration of HARQ-ACK Resource for Msg B

In case of a Msg B transmitted by a BS to a UE, since a response for a single UE or multiple UEs is transmitted, the BS needs to designate a resource for Hybrid Automatic Repeat reQuest-Acknowledgement (HARQ-ACK) transmission from the UE. Hereinafter, a PUCCH resource configuration for transmission of HARQ-ACK with respect to a Msg B of a UE will be described.

In the 4-step RACH procedure on the NR system, a BS may UE-specifically designate a resource for PUCCH to be transmitted by a UE using PDCCH (DCI) of a Msg 4. When PDCCH for scheduling a Msg 4 is configured as DCI format 1_0 scrambled with a Temporary Cell-Radio Network Temporary Identifier (TC-RNTI), unlike the case of DCI format 1_0 scrambled with a Random Access-RNTI (RA-RNTI), five DCI field elements except 1 bit for indicating a DCI format may be additionally indicated as follows.

- TPC command for scheduled PUCCH—2 bits as defined in Subclause 7.2.1 of TS38.213
- PUCCH resource indicator—3 bits as defined in Subclause 9.2.3 of TS38.213
- PDSCH-to-HARQ_feedback timing indicator—3 bits as defined in Subclause 9.2.3 of TS38.213
- HARQ process number—4 bits
- Downlink assignment index—2 bits, reserved Specifically, among the above field elements indicated by a DCI, a maximum 3-bit PUCCH resource indicator and 3-bit PDSCH-to-HARQ_feedback timing indicator may be used for indication of a PUCCH resource.

Here, the PDSCH-to-HARQ_feedback timing indicator is used to indicate a slot interval between a PDSCH including a Msg 4 and a PUCCH including HARQ-ACK to be transmitted by a UE and may indicate a value selected from {0, 1, 2, 3, 4, 5, 6, 7}. For example, when a last slot for receiving the PDSCH including the Msg 4 is #n, the PDSCH-to-HARQ_feedback timing indicator indicates a value selected from {0, 1, 2, 3, 4, 5, 6, 7} as a slot interval k, and the UE transmits the PUCCH including HARQ-ACK in a slot #n+k. A specific indication method of the PDSCH-to-HARQ_feedback timing indicator is described as follows.

| PDSCH-to-HARQ_feedback timing indicator | | | Number of slots k |
|---|---|---|---|
| 1 bit | 2 bits | 3 bits | |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

In addition, the PUCCH resource indicator is used to indicate several parameters for a PUCCH resource configuration and uses a resource mapped according to a bit for dl-DataToUL-ACK SEQUENCE (SIZE (1 . . . 8)) OF INTEGER (0 . . . 15) of a higher layer parameter PUCCH-Config 의 dl-DataToUL-ACK SEQUENCE (SIZE (1 . . . 8)) OF INTEGER. The PUCCH resource indicator is 3 bits. When indicating a specific one of two sets consisting of 8 resources each through Remaining Minimum System Information (RMSI), the PUCCH resource indicator exists to configure a PUCCH of one of the corresponding sets.

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

Like the above 4-step RACH procedure, a 2-step RACH procedure may need a method of designating a PUCCH resource in response to a Msg B. Specifically, in the following, as a method of delivering an indication for a PUCCH resource, a method of utilizing a DCI or MAC (Medium Access Control) Msg B may be considered. Since total 16 PUCCH resources index 0 to index 15 may be configured as PUCCH resources at a prescribed timing, when a BS transmits a Msg B, it should configure and transmit the Msg B by considering the corresponding PUCCH resources. In addition, in the present disclosure, as an initial PUCCH resource index is designated as n, when UEs are allocated sequentially from an index n, if the PUCCH resource index exceeds 15, the UEs may be circularly allocated from an index 0 to an index n.

(1) Indicating a PUCCH Resource Through DCI Only

A corresponding method is a method of designating a PUCCH resource to be used for HARQ-ACK transmission of a UE by utilizing only a DCI for scheduling a Msg B. In this case, a BS may indicate a PDSCH-to-HARQ_feedback timing indicator only through DCI so as to enable the UE to implicitly calculate a PUCCH resource, or may explicitly indicate a PDSCH-to-HARQ_feedback timing indicator and an initial PUCCH resource index or a PUCCH resource indicator through DCI.

1) First, a BS may designate a slot for transmitting a PUCCH by indicating a slot interval with a PDSCH-to-HARQ_feedback timing indicator among DCI fields of a Msg B. All UEs related to the corresponding Msg B transmit HARQ-ACK for Msg B reception in a slot designated through the PDSCH-to-HARQ_feedback timing indicator. In doing so, a PUCCH resource index may be sequentially one-to-one mapped to an index order of a MAC subheader. For example, having detected its RAPID and UE-ID from #1 subheader, the UE transmits HARQ-ACK through a PUCCH resource index #1. Having detected its RAPID and UE-ID from #2 subheader, the UE transmits HARQ-ACK through a PUCCH resource index #2. Since the UE is implicitly aware of a PUCCH resource index through its subheader index, the present method has an advantage in that the signaling overhead of a BS is greatly reduced.

2) ABS may indicate a slot for transmitting a PUCCH by indicating a slot interval using a PDSCH-to-HARQ_feedback timing indicator among DCI fields of a Msg B, and may configure an initial PUCCH resource index. In this case, the BS may directly indicate a PUCCH resource using 4 bits for a PUCCH resource index having a value of 0-15, or may indirectly indicate a PUCCH resource using a PUCCH resource indicator in a manner similar to a 4-step RACH procedure.

In case of the aforementioned method of only indicating a PDSCH-to-HARQ_feedback timing indicator by a BS, PUCCH resource indexes #0~#15 are unconditionally allocated in order. However, in case of the present method, a BS configures an initial value of a PUCCH resource index, and a UE receives allocation of a PUCCH resource index in a manner of being sequentially one-to-one mapped for an index of a MAC subheader with reference to an index of the configured initial value. For example, if a PUCCH resource index #15 is configured in a DCI field, a UE detecting its RAPID and UE-ID from #1 subheader of a Msg B transmits HARQ-ACK through a PUCCH resource index #15, and the UE detecting its RAPID and UE-ID from #2 subheader transmits HARQ-ACK through a PUCCH resource index #0. In addition, the UE detecting its RAPID and UE-ID from #3 subheader transmits HARQ-ACK through a PUCCH resource index #1.

3) In case of the method 1) or method 2) described above, since all the 16 PUCCH resource indexes are sequentially allocated, although an unusable PUCCH resource index exits, a BS is unable to indicate the corresponding PUCCH resource index. To compensate for this, the unusable PUCCH resource index may be additionally indicated by using bits or a bitmap corresponding to the PUCCH resource index. Namely, PUCCH Resource Indicators (PRIs) are sequentially assigned to a UE in order of MAC Protocol Data Unit (PDU) by omitting a part with a value of '0' from the additionally indicated bitmap and allocating the PRIs. For example, when a bitmap for indicating an unusable PUCCH resource index is '1011111111111111', since a second bit value of the above bitmap is '0', the UE having detected its RAPID and UE-ID from #2 subheader of a Msg B omits a PUCCH resource index #2 and transmits HARQ-ACK through a PUCCH resource index #3. And, the UE having detected its RAPID and UE-ID from #3 subheader of a Msg B transmits HARQ-ACK through a PUCCH resource index #4.

(2) Indicating a PUCCH Resource Through MAC Msg B Only

According to the corresponding method, in transmitting a MAC Msg B (success RAR), a BS configures a PDSCH-to-HARQ_feedback timing indicator (3 bits) and a PUCCH resource index (4 bits) or a PUCCH resource indicator (3 bits) for each UE, which is a method of explicitly indicating 6- or 7-bit information through a Msg B (success RAR).

Namely, according to the present method, when an RAR message received by a UE through a Msg B is successRAR, a PUCCH Tx resource may be indicated by a 4-bit PUCCH resource related indication field in the successRAR and a PUCCH Tx resource may be indicated by a 3-bit PDSCH-to-HARQ_feedback timing indication field in the successRAR. Although the present method has a disadvantage in that a size of a Msg B (success RAR) increases as the Msg B (success RAR) includes a plurality of informations, it has an advantage in that a BS can designate a PUCCH resource of each UE with full flexibility.

(3) Indicating a PUCCH Resource Using Both DCI and MAC Msg B

The corresponding method is a method of taking advantage of the above-described methods (1) and (2) by excluding the extremes, and utilizes both DCI and MAC Msg B (success RAR). The method may have various embodiments as follows, depending on transmitting parameters such as a PDSCH-to-HARQ_feedback timing indicator and a PUCCH resource index or a PUCCH resource indicator and the like through which information of DCI and MAC Msg B (success RAR).

1) The following may be taken into consideration. First, a PDSCH-to-HARQ_feedback timing indicator (3 bits) and a PUCCH resource index (4 bits) or a PUCCH resource indicator (3 bits) may be included in DCI and a 1- or 2-bit PUCCH resource offset value may be delivered by being included in a MAC Msg B (success RAR).

In this case, as a PDSCH-to-HARQ_feedback timing indicator parameter is basically transmitted by DCI, signaling overhead increases, which may be compensated in a manner of designating a PUCCH resource offset value for each UE in a MAC Msg B (success RAR). A PUCCH resource index or a PUCCH resource indicator is transmitted by the DCI as well, thereby designating an initial PUCCH resource index like the aforementioned methods. In this case, in the corresponding method, an offset value indicated by the MAC Msg B (success RAR) may be N bits, and the offset may be utilized in the following manners.

(a) An offset indicated by a MAC Msg B (success RAR) may be utilized in a manner of being originally applied to a PRI value of a UE itself. Namely, the UE may transmit HARQ-ACK through a PUCCH resource corresponding to a PRI value to which an offset value is applied with reference to a PRI index of its own.

A UE receives assignment of its own PUCCH resource index according to a subheader index of a MAC Msg B (success RAR) sequentially with reference to an initial PUCCH resource index designated through a DCI. If an offset is indicated to the UE through a MAC Msg B (success RAR), the UE transmits HARQ-ACK on a PUCCH resource having an index increased or decreased by a corresponding offset value.

For example, when a bit indicating an offset is 1, an offset value may become +1 or −1. If a bit indicating an offset is 2, an offset value may indicate a value of {+2, +1, −1, −2}, a value of {+4, +3, +2, +1}, or a value of {−4, −3, −2, −1}. If an initial PUCCH resource index is #M, a UE having detected its RAPID and UE-ID from a $K^{th}$ subheader receives assignment of a PUCCH resource index #M+K. If a value of #M+K is greater than 15, a value according to a cyclic shift is assigned. By applying the above offset value a thereto, the UE transmits HARQ-ACK on a PUCCH resource of an index #M+K+a or #M+K−a.

(b) An offset indicated by a MAC Msg B (success RAR) may be utilized by being applied with reference to a location of a previous UE. Namely, while offsets cumulated for previous UEs are applied as they are, it is able to determine a PUCCH resource to use by additionally applying an offset indicated for a MAC subheader of a UE itself.

For example, when an initial PUCCH resource index is #M, if a first UE having detected its RAPID and UE-ID through a first subheader receives an indication of an offset amounting to 3, the corresponding first UE transmits HARQ-ACK on a PUCCH resource of an index #M+3. In this case, if a second UE having detected its RAPID and UE-ID through a second subheader receives an indication of an offset amounting to 2, the second UE transmits HARQ-ACK on a PUCCH resource of #M+3+2 in a state that the offset value amounting to 3 applied to the first UE is cumulatively applied thereto.

2) As another embodiment, the following may be taken into consideration. First, only a PDSCH-to-HARQ_feedback timing indicator (3 bits) is included in a DCI, and each PRI to indicate a PUCCH resource indictor (3 bits) is included in a MAC Msg B (success RAR).

Namely, the corresponding embodiment delivers a common PUCCH Tx slot via DCI and UE-specifically designates a PUCCH resource index or a PUCCH resource indicator for each UE through a MAC Msg B (success RAR). According to the present embodiment, signaling overhead may increase more than the aforementioned method of indicating an offset in a MAC Msg B (success RAR), but flexibility for a PUCCH resource indication of a BS can be increased.

3) As further embodiment, the following may be taken into consideration. First, only a PUCCH resource index (4 bits) or a PUCCH resource indicator (3 bits) is included in DCI, and each PDSCH-to-HARQ_feedback timing indicator (3 bits) is included in a MAC Msg B (success RAR).

The corresponding embodiment is a method of classifying each PUCCH resource by differentiating a time (slot) configuration of each PUCCH resource. That is, a BS designates a DCI common PUCCH resource index and a PUCCH resource according to the corresponding index is used. Alternatively, when information of a PUCCH resource index is not included in a DCI, all UEs initially use a PUCCH resource according to a PUCCH resource index #0, and each UE transmits a PUCCH through a corresponding slot by referring to a slot timing determined according to information included in a MAC Msg B (success RAR).

Figure 21:
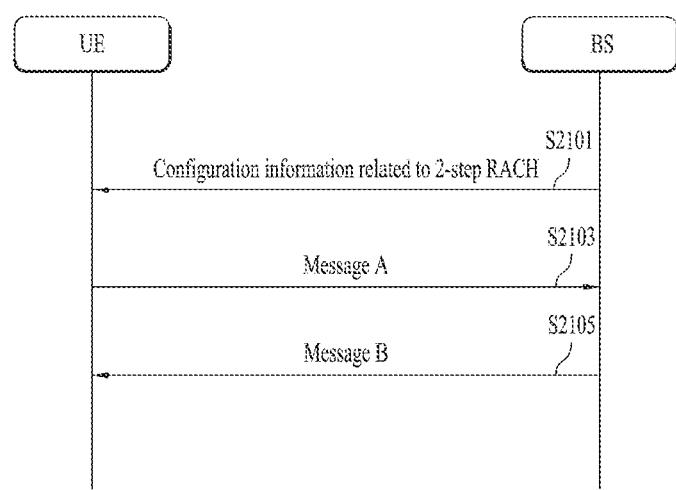
FIG. 21 is a flowchart illustrating the operations of the UE and the BS that are configured to perform the 2-step RACH procedure according to various embodiments of the present disclosure.

FIG. 21 is a diagram illustrating an operation flow of a user equipment and base station to perform a 2-step RACH procedure based on embodiments of the present disclosure. A UE and a BS transceive RACH configuration information for performing a 2-step RACH procedure, and information (e.g., a ramping step size and/or a ramping counter, a Tx beam or a spatial filter, etc.) related to the embodiments of the present disclosure may be included in the corresponding information as well [S2101]. Specifically, the BS may transmit RACH configuration information using Synchronization Signal Block (SSB) such as Master Information Block (MIB) and System Information Block (SIB) and/or RRC signaling.

The step S2101 may be skipped in case of a UE having established a connection state such as a UE having received the RACH configuration information or a UE re-accessing the BS having transmitted the RACH configuration information. Since the corresponding UEs have obtained the RACH configuration information already, the corresponding step may be skipped to reduce a processing delay due to redundant transmission/reception of the already-received RACH configuration information.

Figure 22:
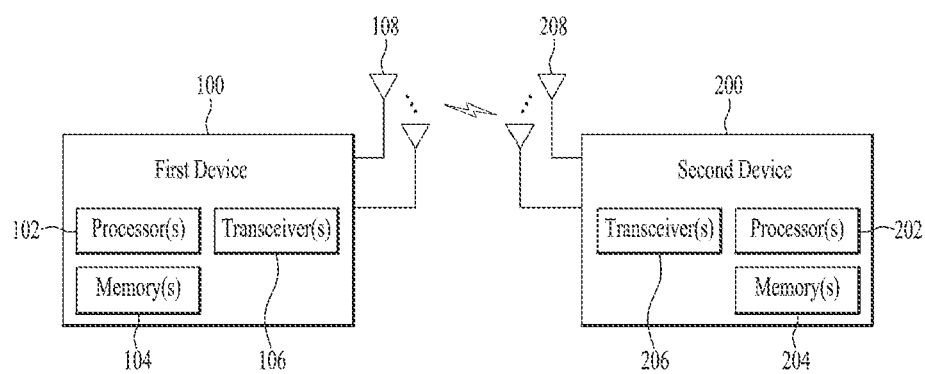
FIGS. 22 to 25 are diagrams illustrating various exemplary wireless devices to which embodiments of the present disclosure are applied.
Figure 23:
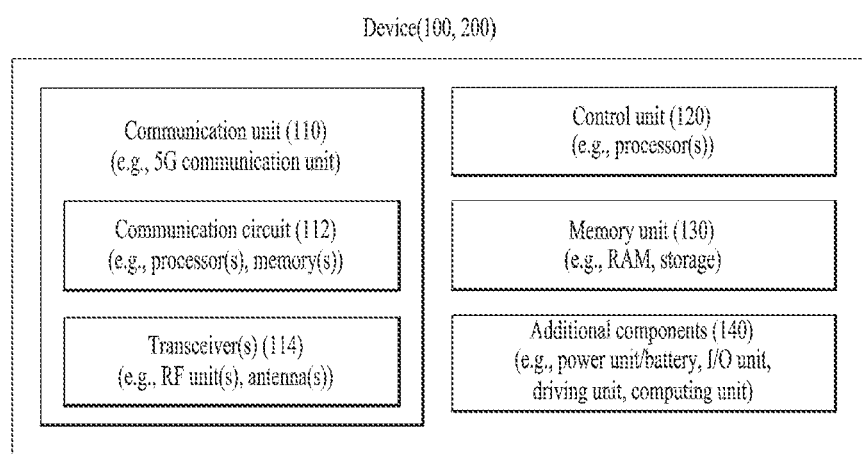

The UE in the step S2101 may include the first wireless device 100 of FIG. 22 or the wireless device 100/200 of FIG. 23, and the BS may include the second wireless device 200 of FIG. 22 or the wireless device 100/200 of FIG. 23. Namely, the step S2101 of receiving the RACH configuration information from the BS by the UE may be implemented by various wireless devices that will be described below in FIGS. 22 to 25. For example, when the UE includes the first wireless device 100 of FIG. 22, a processor 102 of FIG. 22 may control one or more transceivers 106 and/or one or more memories 104 and the like to receive the RACH configuration information, and the one or more transceivers 106 may receive the RACH configuration information from the BS.

Thereafter, the UE may obtain informations (contents) on a Msg A based on the RACH configuration information received from the BS, and may transmit the Msg A for performing a 2-step RACH procedure by selecting a RACH Occasion (RO)/Preamble and a PUSCH Occasion (PO)/PUSCH resource unit (PRU) according to the obtained informations [S2103]. Here, the UE may transmit the Msg A based on such configurations related to the embodiments of the present disclosure as a ramping step size and/or counter, a Tx beam or spatial filter, etc. for Tx power configuration of the Msg A.

The UE in the step S2103 may include the first wireless device 100 of FIG. 22 or the wireless device 100/200 of FIG. 23, and the BS may include the second wireless device 200 of FIG. 22 or the wireless device 100/200 of FIG. 23. Namely, the step S2103 of transmitting the Msg A to the BS by the UE may be implemented by various wireless devices that will be described below in FIGS. 22 to 25. For example, when the UE includes the first wireless device 100 of FIG. 22, a processor 102 of FIG. 22 may control one or more transceivers 106 and/or one or more memories 104 and the like to transmit the Msg A, and the one or more transceivers 106 may transmit the Msg A to the BS.

In this case, for one example of the Msg A transmission of the step S2103, in consideration of an RO allocated for a 4-step RACH procedure, an RO in a 2-step RACH procedure may be configured: i) an independent RO and preamble are configured for each of the 2-step RACH procedure and the 4-step RACH procedure; ii) the same RO is shared but a preamble is separately configured each of the 2-step RACH procedure and the 4-step RACH procedure; or iii) the same RO and preamble are shared for the 2-step RACH procedure and the 4-step RACH procedure.

For another example of the Msg A transmission of the step S2103, a PRU for transmission of a Msg A PUSCH may be defined by considering a PO, a DMRS port and a DMRS sequence, and the PO may be defined as a time-frequency resource for payload transmission. In this case, a PO for PUSCH of a Msg A may be separately configured from an RO or may be configured as a relative time and/or frequency position in consideration of an associated RO, and one or more PO(s) may be configured within a configuration cycle of the Msg A PUSCH.

For another example of the Msg A transmission of the step S2103, PRACH and PUSCH included in a Msg A may be transmitted in different slots by Time Division Multiplexing (TDM), or may be transmitted in the same slot. So to speak, Msg A PUSCH and Msg A PRACH may be transmitted in a time domain consecutively or by leaving a specific gap in between.

For another example of the Msg A transmission of the step S2103, PRACH and PUSCH included in a Msg A may be transmitted: i) using the same beam or Tx spatial filter; ii) using the same or different beams or Tx spatial filters according to UE's determination; or iii) using a beam or Tx spatial filter configured by a BS.

For another example of the Msg A transmission of the step S2103, after a Msg A has been transmitted, a UE may configure a Random Access Response (RAR) window for monitoring a Msg B. In this case, in order to record a reattempt count of a 2-step RACH procedure, the UE may configure a retransmission counter of the Msg A, and a maximum value of the counter may be configured by a BS or network.

For another example of the Msg A transmission of the step S2103, a BS may detect a preamble of a Msg A PRACH and process payload/data of the Msg A PUSCH by decoding. If the BS fails to detect the preamble of the Msg A PRACH, the BS may not deliver any information to a UE.

As described above, in the step S2103 in which the UE transmits the Msg A to the BS, embodiments of the present disclosure may be appropriately applied. Specifically, a Tx power for the Msg A may be configured or indicated based on the methods according to the embodiments of the present disclosure described above.

Having transmitted the Msg A, the UE may receive a Msg B [S2105]. Here, the Msg B may be scheduled through PDCCH corresponding to DMRS, and may be transmitted through PDSCH corresponding to the DMRS. Informations (contents) included in the Msg B may be changed according to the decoding and processing results of the Msg A PUSCH.

Specifically, when the BS successfully decodes the Msg A PUSCH, the Msg B may include a contention resolution ID (as a success RAR) such as a UE identifier transmitted as Common Control Channel (CCCH) Service Data Unit (SDU) by the UE. If the BS fails to decode the Msg A PUSCH, the Msg B may include RAPID and UL grant information for retransmission of the Msg A PUSCH as a fallback RAR. When the BS transmits a fallback RAR through the Msg B, the UE successfully having decoded the RAPID and UL grant included in the Msg B may fall back to the 4-step RACH procedure.

The UE in the step S2105 may include the first wireless device 100 of FIG. 22 or the wireless device 100/200 of FIG. 23, and the BS may include the second wireless device 200 of FIG. 22 or the wireless device 100/200 of FIG. 23. Namely, the step S2105 of receiving the Msg B from the BS by the UE may be implemented by various wireless devices that will be described below in FIGS. 22 to 25. For example, when the UE includes the first wireless device 100 of FIG. 22, a processor 102 of FIG. 22 may control one or more transceivers 106 and/or one or more memories 104 and the like to receive the Msg B, and the one or more transceivers 106 may receive the Msg B from the BS.

The UE may take an operation, which is identical or similar to an operation after a UE performing the existing 4-step RACH procedure has received a Msg 4, depending on a presence or non-presence of decoding and reception of the Msg B. If the UE successfully receives the Msg B within the RAR window, the UE may determine that the 2-step RACH procedure is successful. Alternatively, when the UE receives a fallback RAR, the UE may perform a Msg3 transmission procedure on the 4-step RACH procedure based on information included in the Msg B, such as UL grant.

On the other hand, when the UE does not receive Msg B in the RAR window, the UE may retransmit a Msg A to reattempt the 2-step RACH procedure if a retransmission counter is smaller than a maximum value. If the retransmission counter reaches the maximum value, the UE may perform a backoff operation by determining the failure in the 2-step RACH procedure. Here, the retransmission of the Msg A may mean retransmission of a Msg A PRACH including reselection of a preamble and retransmission of a Msg A PUSCH. If a Tx beam or spatial filter for the retransmission of the Msg A PRACH is different from that of a Msg APRACH recently transmitted, a power ramping counter of the Msg A PRACH may not increase.

Embodiments related to the 2-step RACH procedure of the present disclosure described above may also be applicable to RRC_INACTIVE, RRC_CONNECTED, and RRC_IDLE states, and may include a general Medium Access Control (MAC) procedure. In addition, embodiments related to the 2-step RACH Procedure of the above-described disclosure may not be exceptionally applied to a System Information (SI) request and/or a Beam Failure Recovery (BFR) procedure. In addition, an operation of re-performing the existing 4-step RACH procedure may be configured in consideration of the fallback in the 2-step RACH procedure described above.

The various details, functions, procedures, proposals, methods, and/or operational flowcharts described in this document may be applied to a variety of fields that require wireless communication/connection (e.g., 5G) between devices.

Hereinafter, a description will be given in detail with reference to drawings. In the following drawings/descriptions, the same reference numerals may denote the same or corresponding hardware blocks, software blocks, or functional blocks unless specified otherwise.

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including commands for performing all or a part of processes controlled by the processor(s) 102 or for performing the descriptions, functions, procedures, proposals, methods, and/or operational flowcharts disclosed in this document. Herein, the processor(s) 102 and the memory(s) 104 may be part of a communication modem/circuit/chip designed to implement RAT (e.g., LTE or NR). The transceiver(s) 106 may be connected to the processor(s) 102 and transmit and/or receive radio signals through the one or more antennas 108. Each of the transceiver(s) 106 may include a transmitter and/or a receiver. The transceiver(s) 106 may be interchangeably used with RF unit(s). In the present disclosure, a wireless device may refer to a communication modem/circuit/chip.

Specifically, commands stored in a memory 104 and/or operations, which are controlled by a processor 102 of the second wireless device 100 according to an embodiment of the present disclosure will be described below.

While the following operations are described in the context of control operations of the processor 102 from the perspective of the processor 102, software code for performing these operations may be stored in the memory 104.

The processor 102 may control a transceiver 106 to transmit a PRACH and a PUSCH in Msg A. The processor 102 may control the transceiver 106 to receive Msg B related to contention resolution. A specific method of controlling the transceiver 106 to transmit Msg A and receive Msg B by the processor 102 may be based on the foregoing embodiments.

Specifically, commands stored in a memory 204 and/or operations, which are controlled by a processor 202 of the second wireless device 200 according to an embodiment of the present disclosure will be described below.

While the following operations are described in the context of control operations of the processor 202 from the perspective of the processor 202, software code for performing these operations may be stored in the memory 204.

A processor 202 may control a transceiver 206 to receive a PRACH and a PUSCH in Msg A. The processor 202 may control the transceiver 206 to transmit Msg B related to contention resolution. A specific method of controlling the transceiver 106 to receive Msg A and transmit Msg B by the processor 202 may be based on the foregoing embodiments.

Hardware elements of the wireless devices 100 and 200 will be described in more detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive signals (e.g., baseband signals) from the one or more transceivers 106 and 206 and acquire PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, instructions, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit, to one or more other devices, user data, control information, and/or radio signals/channels mentioned in the methods and/or operational flowcharts of this document. The one or more transceivers 106 and 206 may receive, from one or more other devices, user data, control information, and/or radio signals/channels mentioned in the descriptions, functions, procedures, proposals, methods, and/or operational flowcharts disclosed in this document. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be connected to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels from RF band signals into baseband signals in order to process received user data, control information, and radio signals/channels using the one or more processors 102 and 202. The one or more transceivers 106 and 206 may convert the user data, control information, and radio signals/channels processed using the one or more processors 102 and 202 from the base band signals into the RF band signals. To this end, the one or more transceivers 106 and 206 may include (analog) oscillators and/or filters.

FIG. 23 illustrates another exemplary a wireless device applied to the present disclosure. The wireless device may be implemented in various forms according to a use case/service (refer to FIG. 22).

Referring to FIG. 23, wireless devices 100 and 200 may correspond to the wireless devices 100 and 200 of FIG. 22 and may be configured with various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) through the communication unit 110 via a wireless/wired interface or store, in the memory unit 130, information received from the outside (e.g., other communication devices) through the communication unit 110 via the wireless/wired interface. Therefore, a specific operation of the control unit 120 and programs/code/commands/information stored in the memory unit 130 according to the present disclosure may corresponding to at least one operation of the processors 102 and 202 and at least one operation of the memories 104 and 204 illustrated in FIG. 22.

The additional components 140 may be configured in various ways according to the type of wireless device. For example, the additional components 140 may include at least one of a power unit/battery, input/output (I/O) unit, a driving unit, or a computing unit. The wireless device may be implemented in the form of, but not limited to, the robot (100a of FIG. 2), the vehicles (100b-1 and 100b-2 of FIG. 2), the XR device (100c of FIG. 2), the hand-held device (100d of FIG. 2), the home appliance (100e of FIG. 2), the IoT device (100f of FIG. 2), a digital broadcasting terminal, a hologram device, a public safety device, an MTC device, a medical device, a FinTech device (or a financial machine), a security device, a climate/environment device, the AI server/device (400 of FIG. 2), a BS (200 of FIG. 2), a network node, or the like. The wireless device may be used in a mobile or fixed place according to a use case/service.

In FIG. 23, all of the various elements, components, units/portions, and/or modules in the wireless devices 100 and 200 may be inter-connected through a wired interface or at least a part thereof may be wirelessly inter-connected through the communication unit 110. For example, in each of the wireless devices 100 and 200, the control unit 120 and the communication unit 110 may be connected by wire, and the control unit 120 and first units (e.g., 130 and 140) may be connected wirelessly through the communication unit 110. Each element, component, unit/portion, and/or module in the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a RAM, a DRAM, a ROM, a flash memory, a volatile memory, a non-volatile memory, and/or a combination thereof.

Now, a detailed description will be given of an implementation example of the devices illustrated in FIG. 23 with reference to the drawings.

Figure 24:
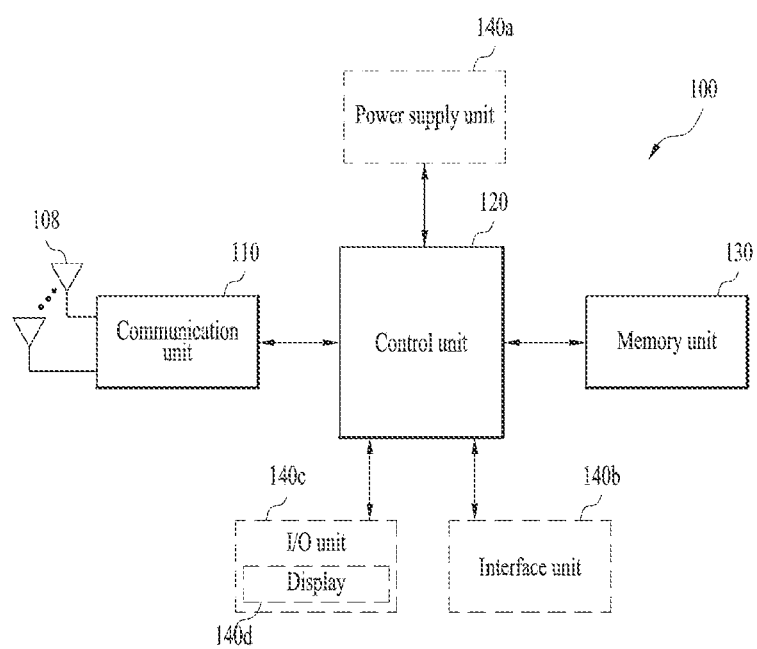

FIG. 24 illustrates a hand-held device applied to the present disclosure. The hand-held device may include a smartphone, a smart pad, a wearable device (e.g., a smart watch or smart glasses), or a portable computer (e.g., a laptop). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, and so on. The interface unit 140b may support connection between the hand-held device 100 and other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by the user and the acquired information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals to original information/signals. The restored information/signals may be stored in the memory unit 130 and output as various types (e.g., text, voice, images, video, or haptic) through the I/O unit 140c.

Figure 25:
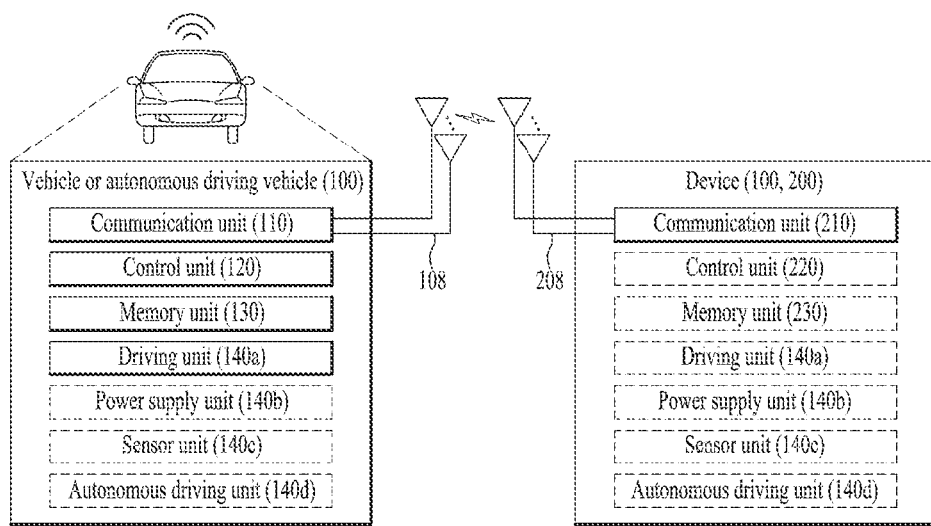

FIG. 25 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling components of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information a vehicle state, ambient environment information, user information, and so on. The sensor unit 140c may include an inertial measurement unit (IMU) sensor, a collision sensor, a wheel sensor, a speed sensor, an inclination sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on from an external server. The autonomous driving unit 140d may generate an autonomous driving path and a driving plan based on the obtained data. The control unit 120 may control the driving unit 140a to drive the vehicle or the autonomous driving vehicle 100 along the autonomous driving path according to the driving plan (e.g., speed/direction control). In the middle of autonomous driving, the communication unit 110 may aperiodically or periodically acquire the latest traffic information data from the external server and acquire surrounding traffic information data from neighboring vehicles. In the middle of autonomous driving, the sensor unit 140c may obtain information about a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and the driving plan to the external server. The external server may predict traffic information data using AI technology based on the information collected from vehicles or autonomous driving vehicles, and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Here, the wireless communication technology implemented in the wireless devices 100 and 200 of the present specification may include Narrowband Internet of Things for low power communication as well as LTE, NR, and 6G. In this case, for example, NB-IoT technology may be an example of Low Power Wide Area Network (LPWAN) technology, and may be implemented in standards such as LTE Cat NB1 and/or LTE Cat NB2, but is not limited to the above-described names. Additionally or alternatively, the wireless communication technology implemented in the wireless devices 100 and 200 of the present specification may perform communication based on the LTE-M technology. In this case, as an example, the LTE-M technology may be an example of LPWAN technology, and may be referred to by various names such as enhance Machine Type Communication (eMTC) and the like. For example, LTE-M technology may be implemented by at least one of various standards such as 1) LTE CAT0, 2) LTE Cat M1, 3) LTE Cat M2, 4) LTE non-Bandwidth Limited (non-BL), 5) LTE-MTC, 6) LTE Machine Type Communication, and/or 7) LTE M, but is not limited to the above-described names. Additionally or alternatively, the wireless communication technology implemented in the wireless devices 100 and 200 of the present specification may include at least one of ZigBee, Bluetooth, and Low Power Wide Area Network (LPWAN) in consideration of low power communication, but is not limited to the above names. For example, ZigBee technology can generate Personal Area Networks (PANs) related to small/low-power digital communication based on various specifications such as IEEE 802.15.4, etc., and may be referred to as various names.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, gNode B (gNB), Node B, enhanced Node B (eNode B or eNB), access point, and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The above-described method and apparatus for transmitting and receiving a signal for performing a random access procedure by a UE in a wireless communication system, are described based on an example of applying to the 5th generation NewRAT system, but are applicable to various wireless communication systems as well as to the 5th generation NewRAT system.

What is claimed is:

1. A method of transmitting a physical uplink control channel (PUCCH) by a user equipment (UE) in a wireless communication system, the method comprising:
 receiving configuration information related to a 2-Step RACH (Random Access Channel);
 transmitting a message A, to a base station (BS), based on the configuration information;
 receiving a message B in response to the message A from the base station; and
 transmitting a hybrid automatic repeat request-acknowledgement (HARQ-ACK) information related to the message B to the base station through the PUCCH,
 wherein the message B includes a success random access response (RAR) including i) 4-bit of PUCCH resource indicator information representing a PUCCH resource from a PUCCH resource set including a plurality of PUCCH resources and ii) 3-bit of HARQ feedback timing information representing a slot in which the PUCCH is transmitted.

2. The method of claim 1,
 wherein the PUCCH resource indicator information includes an initial value of an index representing the one PUCCH resource among the plurality of PUCCH resources.

3. The method of claim 2,
 wherein the resource for transmitting the PUCCH is determined sequentially among the plurality of PUCCH resources based on an index of media access control (MAC) subheader of downlink control information (DCI) and the initial value included in PUCCH resource indicator information.

4. The method of claim 1,
 wherein the PUCCH resource set is configured through a higher layer signaling.

5. The method of claim 1,
 wherein the message B is received based on downlink control information (DCI).

6. The method of claim 1,
 wherein the message B includes the success RAR in response to successful decoding of the message A by the BS.

7. A user equipment (UE) configured to transmit a physical uplink control channel (PUCCH) in a wireless communication system, the UE comprising:
 at least one transceiver;
 at least one processor; and at least one memory operably connected to the at least one processor and configured to cause, when executed, the at least one processor to perform an operation, the operation comprising:

receiving configuration information related to a 2-Step RACH (Random Access Channel);

transmitting a message A, to a base station (BS), based on the configuration information;

receiving a message B in response to the message A from the base station; and transmitting a hybrid automatic repeat request-acknowledgement (HARQ-ACK) information related to the message B to the base station through the PUCCH, wherein the message B includes a success random access response (RAR) including i) 4-bit of PUCCH resource indicator information representing a PUCCH resource from a PUCCH resource set including a plurality of PUCCH resources and ii) 3-bit of HARQ feedback timing information representing a slot in which the PUCCH is transmitted.

8. The UE of claim 7, wherein the PUCCH resource indicator information includes an initial value of an index representing the one PUCCH resource among the plurality of PUCCH resources.

9. The UE of claim 8, wherein the resource for transmitting the PUCCH is determined sequentially among the plurality of PUCCH resources based on an index of media access control (MAC) subheader of downlink control information (DCI) and the initial value included in PUCCH resource indicator information.

10. The UE of claim 8, wherein the PUCCH resource set is configured via a higher layer signaling.

11. The UE of claim 7, wherein the message B is received based on downlink control information (DCI).

12. The UE of claim 7, wherein the message B includes the success RAR in response to successful decoding of the message A by the BS.

13. A method of receiving a physical uplink control channel (PUCCH) by a base station (BS) in a wireless communication system, the method comprising:

transmitting, to a user equipment (UE), configuration information related to a 2-Step RACH (Random Access Channel);

receiving a message A based on the configuration information;

transmitting, to the UE, a message B in response to the message A; and receiving a hybrid automatic repeat request-acknowledgement (HARQ-ACK) information related to the message B through the PUCCH, wherein the message B includes a success random access response (RAR) including i) 4-bit of PUCCH resource indicator information representing a PUCCH resource from a PUCCH resource set including a plurality of PUCCH resources and ii) 3-bit of HARQ feedback timing information representing a slot in which the PUCCH is transmitted.

* * * * *